(12) United States Patent
Komura

(10) Patent No.: US 11,853,211 B2
(45) Date of Patent: Dec. 26, 2023

(54) COMPUTER-READABLE RECORDING MEDIUM STORING DATA PLACEMENT PROGRAM, PROCESSOR, AND DATA PLACEMENT METHOD

(71) Applicant: FUJITSU LIMITED, Kawasaki (JP)

(72) Inventor: Yukihiro Komura, Katsushika (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 17/709,489

(22) Filed: Mar. 31, 2022

(65) Prior Publication Data
US 2022/0405204 A1 Dec. 22, 2022

(30) Foreign Application Priority Data
Jun. 17, 2021 (JP) .................................. 2021-100602

(51) Int. Cl.
*G06F 12/08* (2016.01)
*G06F 12/0802* (2016.01)

(52) U.S. Cl.
CPC ................................ *G06F 12/0802* (2013.01)

(58) Field of Classification Search
CPC ...... G06F 12/08; G06F 12/0802; G06F 12/06; G06F 9/50
See application file for complete search history.

(56) References Cited

U.S. PATENT DOCUMENTS

| 2008/0170591 A1* | 7/2008 | Kameyama | ........... H04L 1/0041 |
| | | | 370/476 |
| 2014/0059280 A1* | 2/2014 | Im | .......................... G06F 12/00 |
| | | | 711/147 |

(Continued)

FOREIGN PATENT DOCUMENTS

| EP | 1944898 A2 * | 7/2008 | ........... H04L 1/0041 |
| JP | 2019-008421 A | 1/2019 | |

(Continued)

OTHER PUBLICATIONS

Y. Zhang and Z. Ye, "Data Maintenance and Control Strategy of Group Management," 2011 Second International Conference on Innovations in Bio-inspired Computing and Applications, Shenzhen, China, 2011, pp. 141-144.*

(Continued)

*Primary Examiner* — Pierre Michel Bataille
(74) *Attorney, Agent, or Firm* — Fujitsu Patent Center

(57) ABSTRACT

A data placement program causes a computer to execute a process of data placement in a main memory and a cache. When performing an operation using a first data groups and second data groups to generate pieces of operation result data representing operation results of the operation, based on a size of one piece of the operation result data and a size of an operation result area storing some of the plurality of pieces of operation result data in the cache memory, determining a number of the first data groups and a number of the second data groups, both corresponding to the some pieces of operation result data, and placing the plurality of first data groups and the plurality of second data groups in the main memory based on the determined number of the first data groups and the determined number of the second data groups.

11 Claims, 20 Drawing Sheets

(56) References Cited

U.S. PATENT DOCUMENTS

| | | | | |
|---|---|---|---|---|
| 2015/0365474 A1* | 12/2015 | Matsuda | ............... | H04L 67/141 |
| | | | | 709/201 |
| 2016/0035427 A1* | 2/2016 | Yu | ...................... | G11C 16/3418 |
| | | | | 365/185.11 |
| 2019/0129847 A1* | 5/2019 | Roh | ...................... | G06F 3/0604 |
| 2020/0004462 A1* | 1/2020 | Kim | ................... | G06F 12/0246 |
| 2020/0410340 A1 | 12/2020 | Shimizu | | |
| 2021/0157514 A1* | 5/2021 | Koo | ...................... | G06F 12/128 |

FOREIGN PATENT DOCUMENTS

| | | | | |
|---|---|---|---|---|
| JP | 2021-005242 A | 1/2021 | | |
| WO | WO-2012011473 A1 * | 1/2012 | ........... | H04L 65/608 |
| WO | WO-2012150762 A2 * | 11/2012 | ............. | H04B 7/024 |

OTHER PUBLICATIONS

"An Easy-to-understand Explanation of Convolutional Neural Networks (CNN)", AI Antenna: Start Artificial Intelligence (AI) from Zero, Jul. 12, 2019, [searched on Apr. 8, 2021] (Total 10 pages) [online] https://ai-antena.net/ai-cnn.

"Various Ways to Speed up Convolutional Neural Networks", SmartNews Engineering Blog, Jun. 15, 2017, [searched on Apr. 8, 2021] (Total 18 pages) [online] https://developer.smartnews.com/blog/2017/06/convolution-speed-up/.

\* cited by examiner

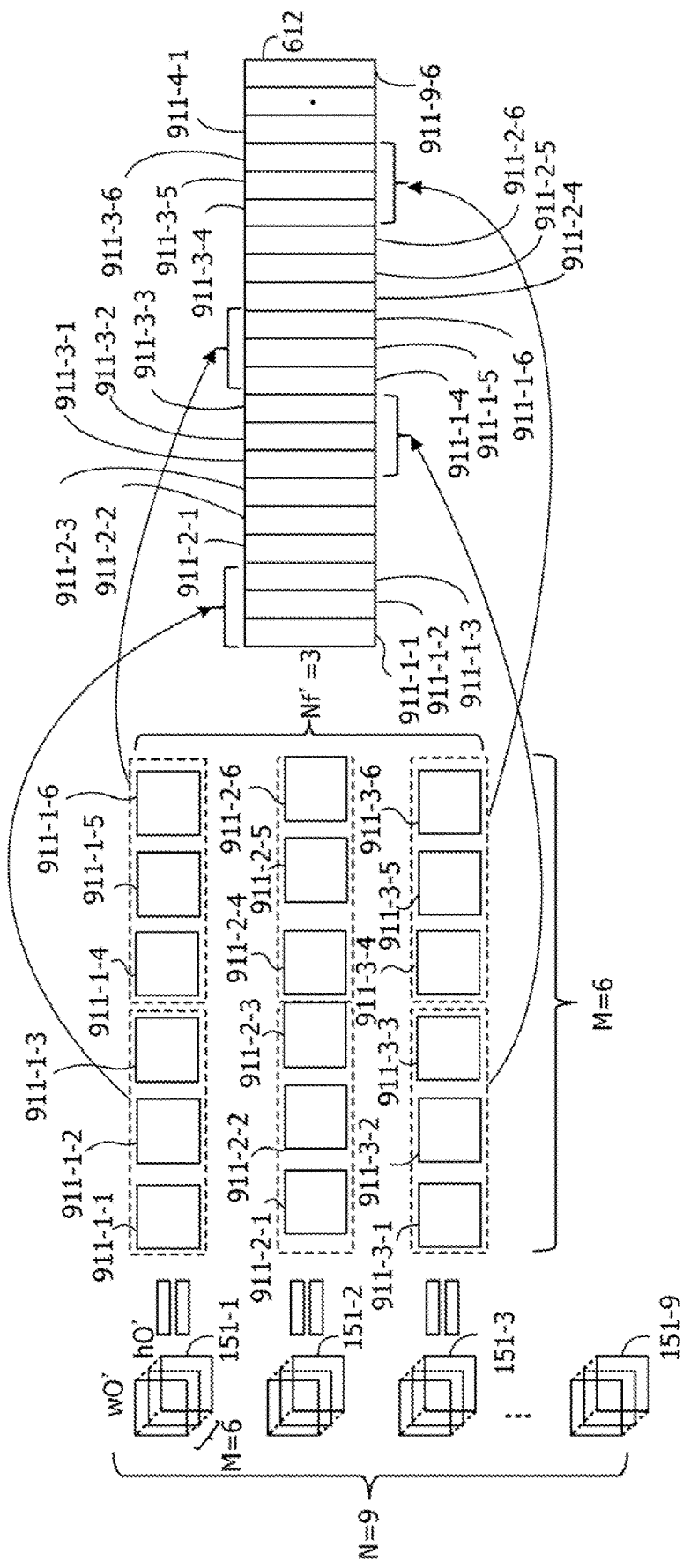

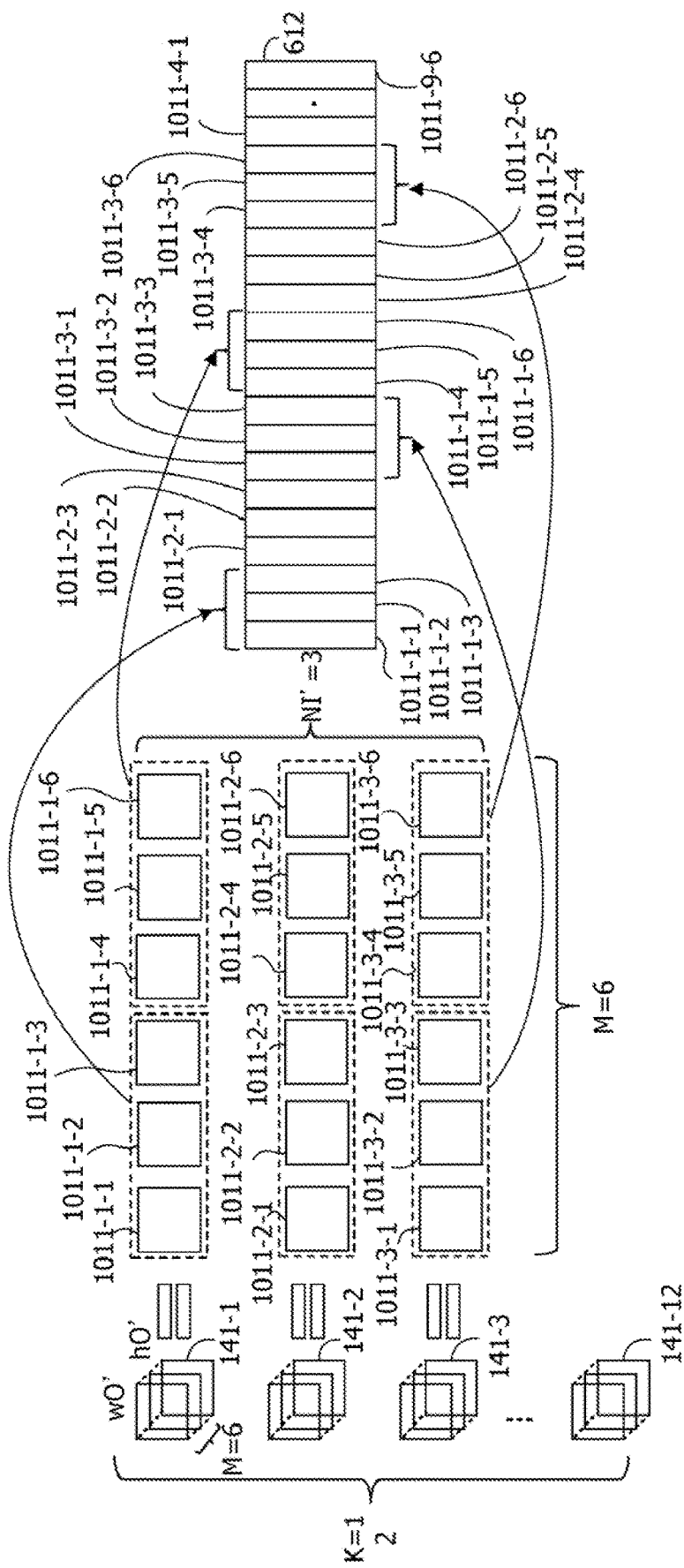

COMPUTER-READABLE RECORDING MEDIUM STORING DATA PLACEMENT PROGRAM, PROCESSOR, AND DATA PLACEMENT METHOD

CROSS-REFERENCE TO RELATED APPLICATION

This application is based upon and claims the benefit of priority of the prior Japanese Patent Application No. 2021-100602, filed on Jun. 17, 2021, the entire contents of which are incorporated herein by reference.

FIELD

The embodiments discussed herein are related to a computer-readable recording medium storing data placement program, processor, and data placement method.

BACKGROUND

In recent years, techniques for image recognition, character recognition, audio recognition and the like using deep learning have been rapidly developed. According to these techniques, in a learning mode, a computer reads big data containing an enormous volume of data, and routinely learns a data feature according to a particular algorithm. In an inference mode, when data to be estimated is input, the computer estimates similarity and identity between input data and learnt data.

The techniques using deep learning have very significant effectiveness, applicability, and effects and thus, their demands in each field are increasing. However, due to an enormous calculation scale, the calculation time in the learning mode and the inference mode is long.

For example, in a convolutional neural network (CNN) that is a deep learning model often used in image recognition, convolution of applying a filter to pixel data of an image is performed. Winograd algorithm is known as an algorithm for speeding-up product-sum operation included in the convolution in the CNN.

A processing method of efficiently performing convolution by using a processor capable of processing a single instruction/multiple data (SIMD) command is also known. An information processor for speeding-up convolution is also known.

Japanese Laid-open Patent Publication Nos. 2019-8421 and 2021-5242 are disclosed as related art.

"An easy-to-understand explanation of Convolutional Neural Networks (CNN)", [online], AI Antenna: Start Artificial Intelligence (AI) from Zero, Jul. 12, 2019, [searched on Apr. 8, 2021], Internet <URL:https://ai-antena.net/ai-cnn> and "Various ways to speed up Convolutional Neural Networks", [online], SmartNews Engineering Blog, Jun. 15, 2017, [searched on Apr. 8, 2021], Internet URL:https://developer.smartnews.com/blog/2017/06/convolution-speed-up/> are also disclosed as related art.

SUMMARY

According to an aspect of the embodiments, a computer-readable recording medium storing data placement program, causing a computer to execute a process including, when performing an operation using a plurality of first data groups and a plurality of second data groups to generate a plurality of pieces of operation result data representing operation results of the operation, based on a size of one piece of the operation result data among the plurality of pieces of operation result data and a size of an operation result area storing some of the plurality of pieces of operation result data in a cache memory, determining the number of the first data groups corresponding to the some pieces of operation result data in the plurality of first data groups and the number of the second data groups corresponding to the some pieces of operation result data in the plurality of second data groups; and placing the plurality of first data groups and the plurality of second data groups in a main memory based on the number of the first data groups and the number of the second data groups.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a view illustrating a placement method of N data groups;

FIG. 10 is a view illustrating a placement method of K data groups;

DESCRIPTION OF EMBODIMENTS

Figure 1:
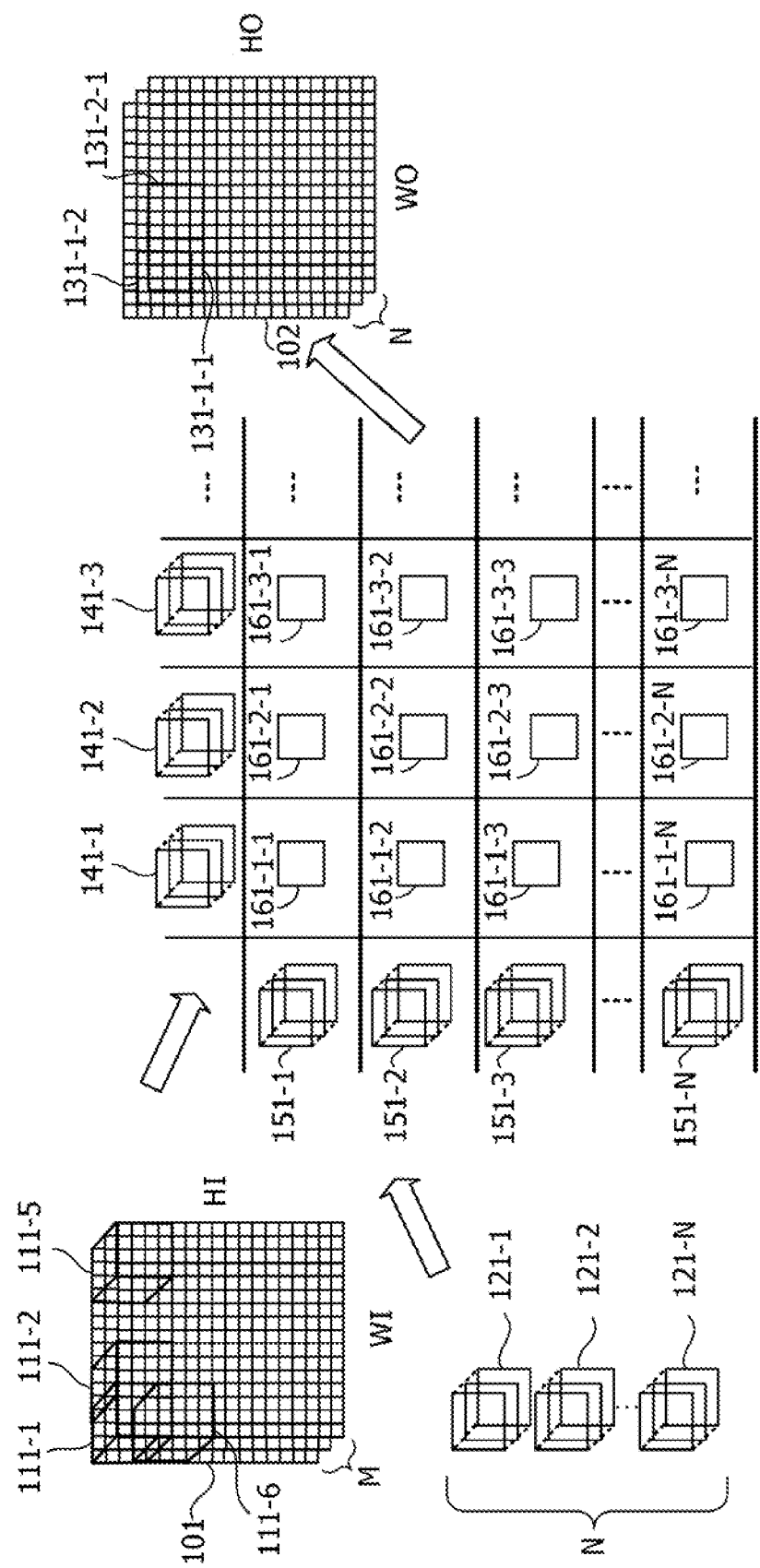
FIG. 1 is a view illustrating convolution using Winograd algorithm.

In the convolution in the CNN in image recognition, a matrix representing an output image is found by multiplying a matrix representing an input image by a matrix representing a filter. However, the number of combinations of the matrix representing the input image and the matrix representing the filter are huge, increasing operating time.

Note that such problem occurs in the convolution in the CNN in image recognition as well as various operations.

From one aspect, the embodiments intend to shorten the operating time of an operation using a plurality of pieces of data.

An embodiment will be described below in detail with reference to drawings.

In the convolution in the CNN in image recognition, a matrix representing an output image is found by multiplying a matrix representing an input image by a matrix representing a filter. In the convolution using Winograd algorithm, a matrix I(i,m) (i=1 to K, m=1 to M) representing a part of an input image and a matrix f(j,m)=1 to N, m=1 to M) representing a jth filter are transformed by following expressions.

$$I'(i,m)=B^T I(i,m)B \quad (1)$$

$$f'(j,m)=G^T f(j,m)G \quad (2)$$

I'(i,m) is a matrix representing a part of a transformed input image, and f'(j,m) is a matrix representing a transformed filter. B and G represent transformation matrixes, and $B^T$ and $G^T$ represent transposed matrixes of B and G, respectively.

M represents the number of channels of the input image, and N represents the number of channels of the output image. K represents the number of I(i,m) included in the input image of each channel.

A matrix O(i,j) (i=1 to K, j=1 to N) represents a part of the output image is found by multiplying I(i,m) by f(j,m) by a following expression.

$$O'(i,j)=\Sigma_{m=1}^M I'(i,m) \odot f'(j,m) \quad (3)$$

$$O(i,j)=A^T O'(i,j)A \quad (4)$$

The right side of the expression (3) represents an addition result of Hadamard product of I'(i,m) and f'(j,m) for m=1 to M. O'(i,j) is a matrix representing a part of the transformed output image, A represents a transformation matrix, and $A^T$ represents a transposed matrix of A.

FIG. 1 illustrates an example of the convolution using Winograd algorithm. Data groups 111-i (i=1 to K) included in an input image 101 correspond to I(i,m) of M channels. WI represents the width (the number of pixels) of the input image 101, and HI represents the height (the number of pixels) of the input image 101.

Data groups 121-j (j=1 to N) correspond to f(j,m) of the M channels. Data 131-i-j included in an output image 102 corresponds to O(i,j). WO represents the width (the number of pixels) of the output image 102, and HO represents the height (the number of pixels) of the output image 102.

Data groups 141-i (i=1 to K) correspond to I'(i,m) of the M channels, data groups 151-j (j=1 to N) correspond to f'(j,m) of the M channels, and data 161-i-j corresponds to O'(i,j).

Although the calculation speed of convolution is improved by using the Winograd algorithm, the calculation of a great number of combinations as illustrated in FIG. 1 is still performed. In the often used deep learning model, M and N are about a few hundred to a few thousand. As an example, assuming K=100, M=$10^3$, N=$10^3$, the total number of combinations is $10^3 \times 10^2 \times 10^3 = 10^8$, and Hadamard product of I'(i,m) and f'(j,m) is calculated for $10^8$ combinations.

In this case, it is expected to shorten a calculation time by utilizing a sector cache included in the architecture of the A64FX (trademark) manufactured by Fujitsu Limited. The sector cache is a function of distinguishing reusable data and non-reusable data from each other and storing the data in respective sectors of a cache memory. The sector cache enables data once stored in the cache memory to be reused without being evicted.

Figure 2:
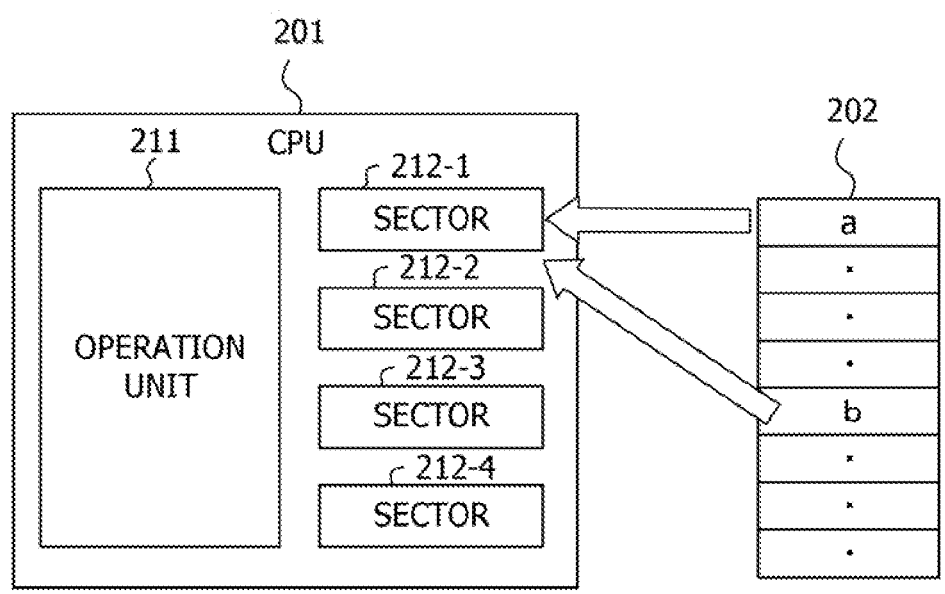
FIG. 2 is a view illustrating the hardware configuration of a CPU having no sector cache function.

FIG. 2 illustrates an example of the hardware configuration of a central processing unit (CPU) having no sector cache function. A CPU 201 in FIG. 2 includes an operation unit 211 and a sector 212-1 to a sector 212-4. The operation unit 211 includes a register and an arithmetic and logic unit (ALU), which are not illustrated. The sector 212-1 to the sector 212-4 are storage areas of a cache memory.

The cache memory loads data a from a main memory 202 into the sector 212-1. The cache memory loads data b from the main memory 202 into the sector 212-1. At this time, when the sector 212-1 has no space area, the data a may be evicted from the sector 212-1.

Figure 3:
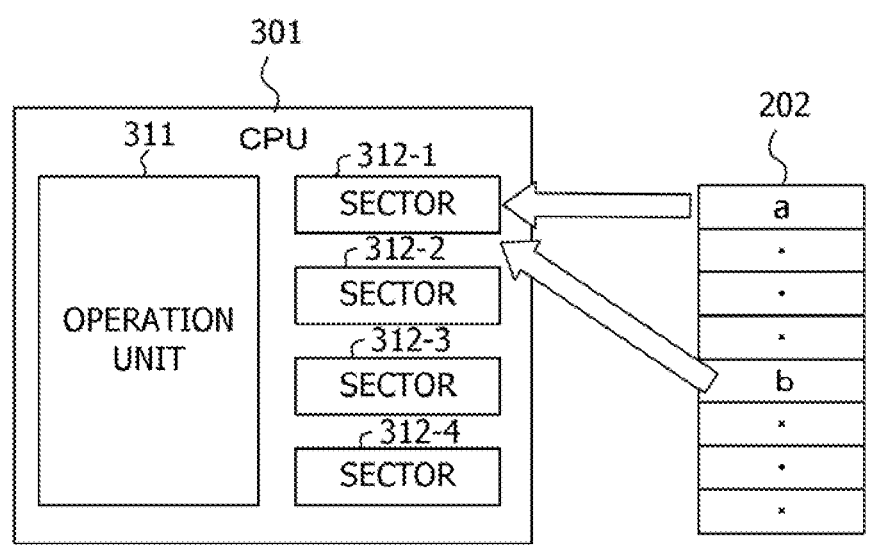
FIG. 3 is a view illustrating the hardware configuration of a CPU having the sector cache function.

FIG. 3 illustrates an example of the hardware configuration of a CPU having the sector cache function. A CPU 301 in FIG. 3 includes an operation unit 311 and a sector 312-1 to a sector 312-4. The operation unit 311 includes a register and an ALU, which are not illustrated. The sector 312-1 to the sector 312-4 are storage areas of a cache memory.

The sector 312-1 is the storage area for storing non-reusable data, and the sector 312-2 to sector 312-4 are storage areas for storing reusable data. The sector cache function suppresses data stored in the sector 312-2 to the sector 312-4 from being evicted.

A programmer specifies loading of data b into any of the sector 312-2 to the sector 312-4 in a program. The cache memory loads data a from the main memory 202 into the sector 312-1. The cache memory loads data b from the main memory 202 into the sector 312-2. The data b stored in the sector 312-2 may be reused without being evicted.

In order to cause a compiler to utilize the sector cache, a following pragma is prepared.

pragma statement scache_isolate_assign

However, due to a small storage capacity of each sector, when the calculation amount for one combination illustrated in FIG. 1 is large, data may not be stored in the sector irrespective of the use of this pragma. This may lead to memory access caused by cache error, decreasing calculation speed.

Figure 4:
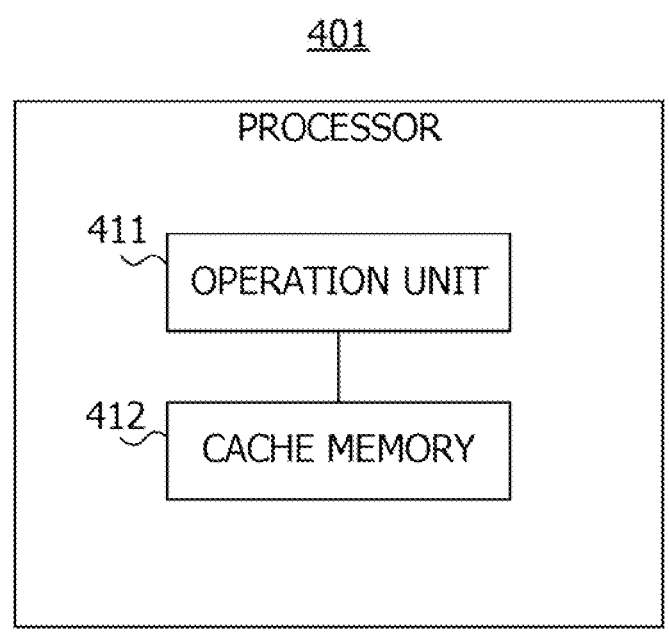
FIG. 4 is view illustrating the functional configuration of a processor according to an embodiment.

FIG. 4 illustrates an example of the hardware configuration of a processor according to an embodiment. A processor 401 in FIG. 4 includes an operation unit 411 and a cache memory 412. The operation unit 411 and the cache memory 412 are hardware.

Figure 5:
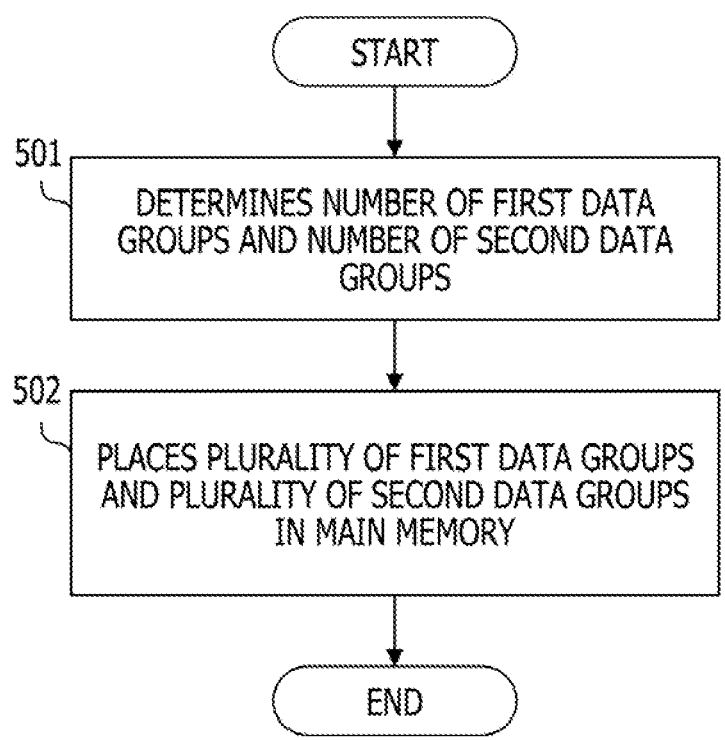
FIG. 5 is a flow chart illustrating data placement processing.

FIG. 5 is a flow chart illustrating an example of data placement processing executed by the processor 401 in FIG. 4. When performing an operation using a plurality of first data groups and a plurality of second data groups to generate a plurality of pieces of operation result data representing operation results of the operation, the operation unit 411 determines the number of the first data groups and the number of the second data groups (step 501).

At this time, the operation unit 411 determines the number of the first data groups and the number of the second data groups based on a size of one piece of the operation result data among the plurality of pieces of operation result data and a size of an operation result area in the cache memory.

The operation result area is an area for storing some of the plurality of pieces of operation result data in the cache memory 412. The number of the first data groups represents the number of the first data groups corresponding to some pieces of the operation result data in the plurality of first data groups. The number of the second data groups represents the number of the second data groups corresponding to some pieces of the operation result data in the plurality of second data groups.

The operation unit 411 places the plurality of first data groups and the plurality of second data groups in a main memory based on the number of the first data groups and the number of the second data groups (step 502).

The processor 401 in FIG. 4 may decrease operating time of the operation using a plurality of pieces of data.

Figure 6:
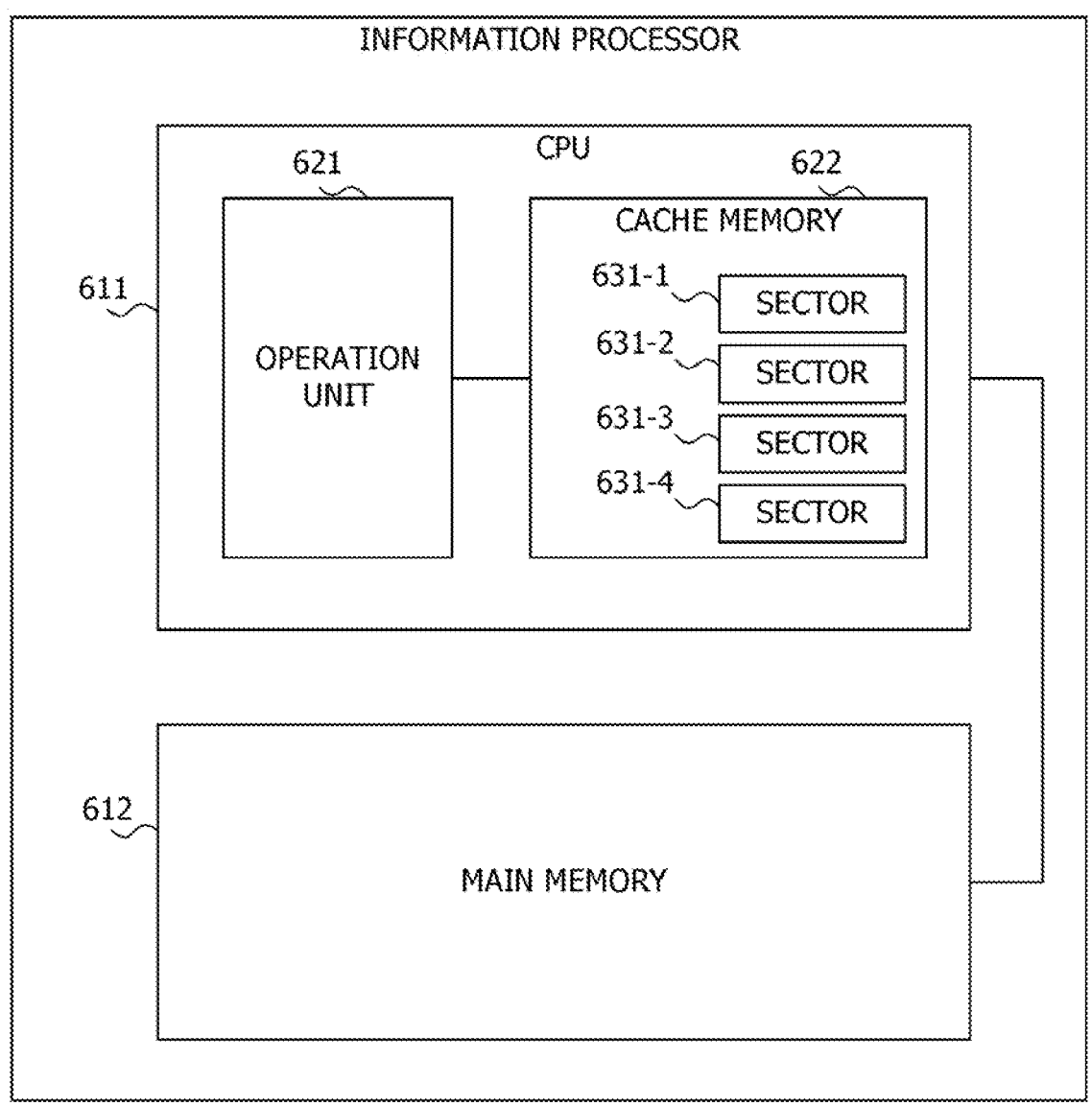
FIG. 6 is a view illustrating a first example of the hardware configuration of an information processor.

FIG. 6 illustrates a first example the hardware configuration of an information processor (computer) including the processor 401 in FIG. 4. The information processor 601 in FIG. 6 includes a CPU 611 and a main memory 612. The CPU 611 and the main memory 612 are hardware. The main memory 612 is a semiconductor memory such as a random-access memory (RAM), and stores a program and data that are used for processing.

The CPU 611 includes an operation unit 621 and a cache memory 622. The operation unit 621 includes a register and an ALU, which are not illustrated, and the cache memory 622 includes a sector 631-1 to a sector 631-4. A CPU having the sector cache function is used as the CPU 611. The CPU 611 may be a CPU of the A64FX (trademark) architecture or a CPU of another architecture.

The sector 631-1 is the storage area for storing non-reusable data, and the sector 631-2 to sector 631-4 are storage areas for storing reusable data. The sector cache function suppresses data stored in the sector 631-2 to the sector 631-4 from being evicted.

The CPU 611 corresponds to the processor 401 in FIG. 4, and the operation unit 621 and the cache memory 622 correspond to the operation unit 411 and the cache memory 412 in FIG. 4, respectively. As an example, the information processor 601 performs the convolution in the CNN illustrated in FIG. 1.

Figure 7:
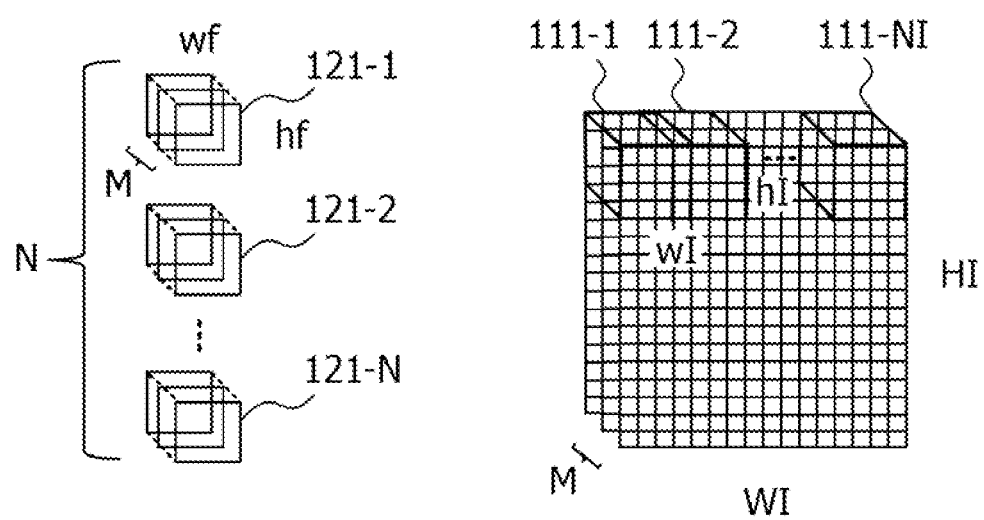
FIG. 7 is a view illustrating an input image and data groups of filters.

FIG. 7 illustrates the data groups 111-$i$ of the input image 101 and the data groups 121-$j$ of the filters in FIG. 1 with reference to FIG. 6 also. WI indicates the width of a partial input image of each channel included in each of the data groups 111-$i$, and HI indicates the height of a partial input image of each channel included in each of the data groups 111-$i$.

NI indicates the number of data groups 111-$i$ horizontally aligned in the input image 101. In FIG. 1, NI is 5. wf indicates the width of the filter of each channel included in each of the data groups 121-$j$, and hf indicates the height of the filter of each channel included in each of the data groups 121-$j$.

The storage capacity of the sectors 631-$k$ ($k$=1 to 4) of the cache memory 622 is Sc. The sector 631-2, the sector 631-3, and the sector 631-4 are used to store the data groups 151-$j$, the data groups 141-$i$, and the data 161-$i$-$j$, respectively. The width and the height of each data 161-$i$-$j$ is determined by the Winograd algorithm, and are indicated as wO' and hO', respectively (as shown in FIG. 9).

The data group 141-$i$ corresponds to the first data group, the data group 151-$j$ corresponds to the second data group, and the data 161-$i$-$j$ corresponds to the operation result data. The sector 631-4 corresponds to the operation result area, Sc corresponds to the size of the operation result area, and the size wO'×hO' of the data 161-$i$-$j$ correspond to the size of the operation result data. The sector 631-2 is an example of a second storage area, and the sector 631-3 is an example of the first storage area.

The operation unit 621 of the CPU 611 determines a division method of K×N pieces of data 161-$i$-$j$. In determining the division method, using Sc and wO'×hO', the operation unit 621 finds the number NO' of the data 161-$i$-$j$ that may be stored in the sector 631-4 by a following expression.

$$NO'=Sc/(wO'\times hO') \quad (11)$$

The number NI' of the data groups 141-$i$ and the number Nf' of data groups 151-$j$ used to calculate the NO' pieces of data 161-$i$-$j$ by a following expression.

$$NI'=Nf'=NO'\wedge(1/2) \quad (12)$$

Thereby, the K×N pieces of data 161-$i$-$j$ are divided into a plurality of groups each including NO' pieces of data 161-$i$-$j$. The K data groups 141-$i$ are divided into a plurality of groups each including NI' data groups 141-$i$, and the N data groups 151-$j$ are divided into a plurality of groups each including Nf' data groups 151-$j$.

Figure 8:
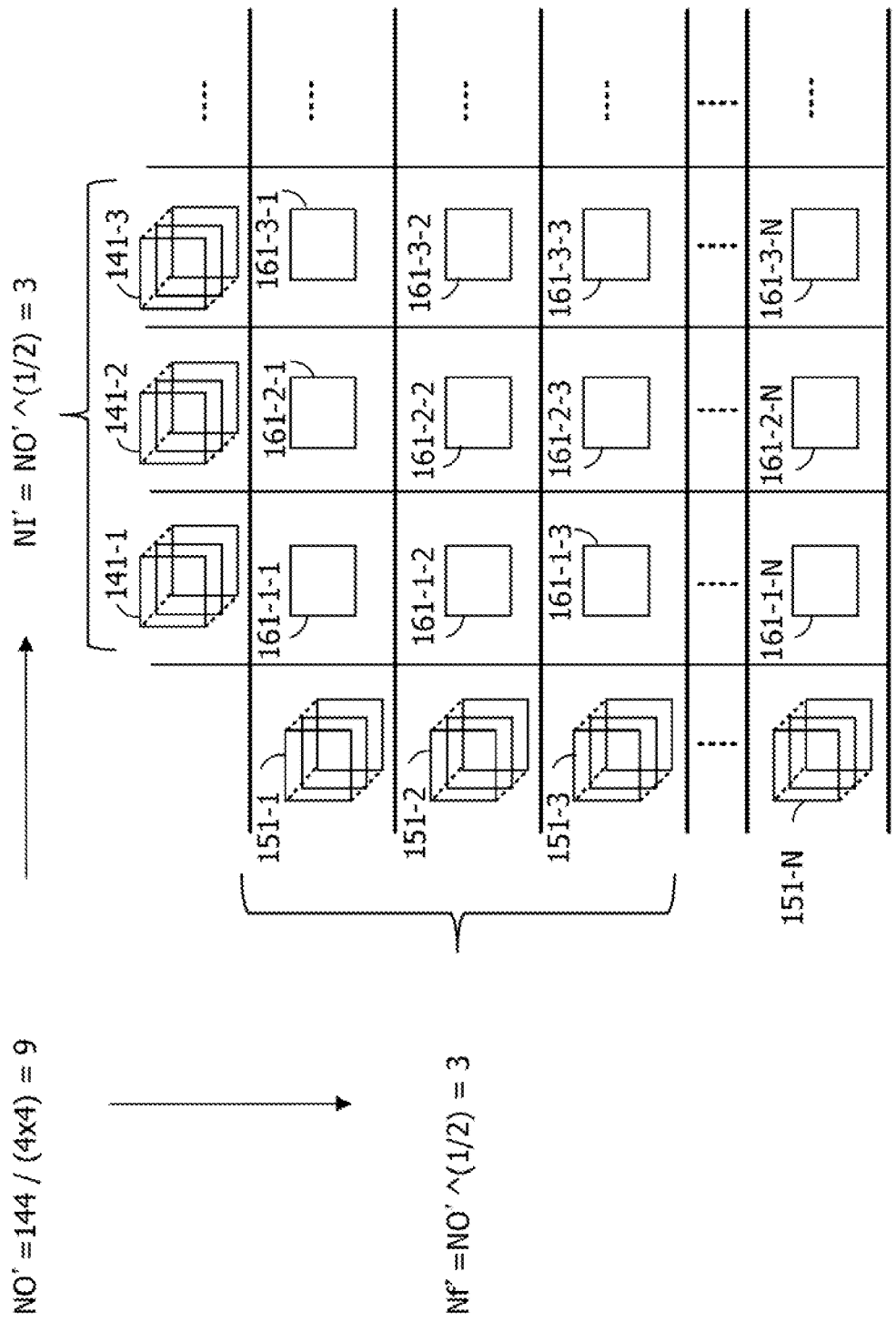
FIG. 8 is a view illustrating a method of determining the number of data groups.

FIG. 8 illustrates an example of a method of determining NI' and Nf'. In the case of Sc=144 and wO'=hO'=4, NO'=144/(4×4)=9 is found by the expression (11), and NI'=Nf'=9^(1/2)=3 is found by the expression (12).

Accordingly, the K×N pieces of data 161-$i$-$j$ are divided into a plurality of groups each including nine pieces of data 161-$i$-$j$. The K data groups 141-$i$ are divided into a plurality of groups each including three data groups 141-$i$, and the N data groups 151-$j$ are divided into a plurality of groups each including three data groups 151-$j$.

Using NI' and Nf', the operation unit 621 determines a placement method of placing the K data groups 141-$i$ and the N data groups 151-$j$ in the main memory 612.

FIG. 9 illustrates an example of the placement method of the N data groups 151-$j$ with reference to FIG. 6. In this example, N=9, M=6, Nf'=3. The width of the filter after transformation of each channel included in each of the data groups 151-$j$ is wO', and the height of the filter after transformation of each channel included in each of the data groups 151-$j$ is hO'.

The operation unit 621 divides the nine data groups 151-$j$ into groups P1 to P3. The group P1 includes the data group 151-1 to the data group 151-3, the group P2 includes the data group 151-4 to the data group 151-6, and the group P3 includes the data group 151-7 to the data group 151-9. The groups P1 to P3 are an example of a plurality of second group.

Data 911-$j$-$m$ ($j$=1 to 9, $m$=1 to 6) corresponds to a matrix f'($j$,$m$) representing a filter after transformation of an mth channel included in the data groups 151-$j$. In the case of Sc=144, wO'=hO'=4, the number of pieces of data 911-$j$-$m$ that may be stored in the sector 631-2 is 9, which is the same as NO'. The number of pieces of data 911-$j$-$m$ ($j$=1 to 3, $m$=1 to 6) included in the group P1 is 18.

Thus, the operation unit 621 divides 18 pieces of data 911-$j$-$m$ into two channel groups each including Nf' channels. The first channel group includes nine pieces of data 911-$j$-$m$ ($j$=1 to 3, $m$=1 to 3), and the second channel group includes nine pieces of data 911-$j$-$m$ ($j$=1 to 3, $m$=4 to 6). The first and second channel groups are an example of a plurality of second partial data groups.

The operation unit 621 places the nine pieces of data 911-$j$-$m$ in the first channel group in a continuous area of the main memory 612, and the nine pieces of data 911-$j$-$m$ in the second channel group in a succeeding continuous area. The continuous area is a storage area having continuous addresses.

The operation unit 621 places 18 pieces of data 911-$j$-$m$ ($j$=4 to 6, $m$=1 to 6) included in the group P2 as in the group P1 in the main memory 612. The operation unit 621 places 18 pieces of data 911-*j*-*m* (j=7 to 9, m=1 to 6) included in the group P3 as in the group P1 in the main memory 612.

In this manner, by determining NI' from NO', N×M pieces of data 911-*j*-*m* may be placed in the main memory 612 such that the sector 631-2 of the cache memory 622 is efficiently used.

Adopting the placement method as illustrated in FIG. 9 enables continuous access to nine pieces of data 911-*j*-*m* to be loaded into the sector 631-2 and facilitates the use of the sector cache using a pragma. In this case, the nine pieces of data 911-*j*-*m* used to calculate nine pieces of data 161-*i*-*j* in each group are previously loaded into the sector 631-2 using the pragma.

FIG. 10 illustrates an example of the placement method of the K data groups 141-*i* with reference to FIG. 6. In this example, K=12, M=6, NI'=3. The width of a partial input image after transformation of each channel included in each of the data groups 141-*i* is wO', and the height of the partial input image after transformation of each channel included in each of the data groups 141-*i* is hO'.

The operation unit 621 divides the twelve data groups 141-*i* into groups Q1 to Q4. The group Q1 includes the data groups 141-1 to 141-3 and the group Q2 includes the data groups 141-4 to 141-6. The group Q3 includes the data group 141-7 to 141-9 and the group Q4 includes the data group 141-10 to 141-12. The groups Q1 to Q4 are an example of a plurality of first group.

Data 1011-*i*-*m* (i=1 to 12, m=1 to 6) corresponds to a matrix I'(i,m) representing a partial input image after transformation of an mth channel included in the data groups 141-*i*. In the case of Sc=144, wO'=hO'=4, the number of pieces of data 1011-*i*-*m* that may be stored in the sector 631-3 is 9, which is the same as NO'. The number of pieces of data 1011-*i*-*m* (i=1 to 3, m=1 to 6) included in the group Q1 is 18.

Thus, the operation unit 621 divides 18 pieces of data 1011-*i*-*m* into two channel groups each including NI' channels. The first channel group includes nine pieces of data 1011-*i*-*m* (i=1 to 3, m=1 to 3), and the second channel group includes nine pieces of data 1011-*i*-*m* (i=1 to 3, m=4 to 6). The first and second channel groups are an example of a plurality of first partial data groups.

The operation unit 621 places the nine pieces of data 1011-*i*-*m* in the first channel group in a continuous area of the main memory 612, and the nine pieces of data 1011-*i*-*m* in the second channel group in a succeeding continuous area.

The operation unit 621 places 18 pieces of data 1011-*i*-*m* (i=4 to 6, m=1 to 6) included in the group Q2 as in the group Q1 in the main memory 612. The operation unit 621 places 18 pieces of data 1011-*i*-*m* (i=7 to 9, m=1 to 6) included in the group Q3 as in the group Q1 in the main memory 612.

The operation unit 621 places 18 pieces of data 1011-*i*-*m* (i=10 to 12, m=1 to 6) included in the group Q4 as in the group Q1 in the main memory 612.

In this manner, by determining NI' from NO', K×M pieces of data 1011-*i*-*m* may be placed in the main memory 612 such that the sector 631-3 of the cache memory 622 is efficiently used.

Adopting the placement method as illustrated in FIG. 10 enables continuous access to nine pieces of data 1011-*i*-*m* to be loaded into the sector 631-3 and facilitates the use of the sector cache using a pragma. In this case, the nine pieces of data 1011-*i*-*m* used to calculate nine pieces of data 161-*i*-*j* in each group are previously loaded into the sector 631-3 using the pragma.

FIGS. 11A to 11F illustrate an example of operational processing using 18 pieces of data 911-*j*-*m* in the group P1 and 18 pieces of data 1011-*i*-*m* in a group Q1, which are placed in the main memory 612 with reference to FIG. 6.

In this operational processing, nine pieces of data 161-*i*-*j* (i=1 to 3, j=1 to 3) are calculated by using the sector 631-2 to the sector 631-4 in the cache memory 622. The data 161-*i*-*j* corresponds to a matrix O'(i,j) representing a part of the transformed output image.

Figure 11A:
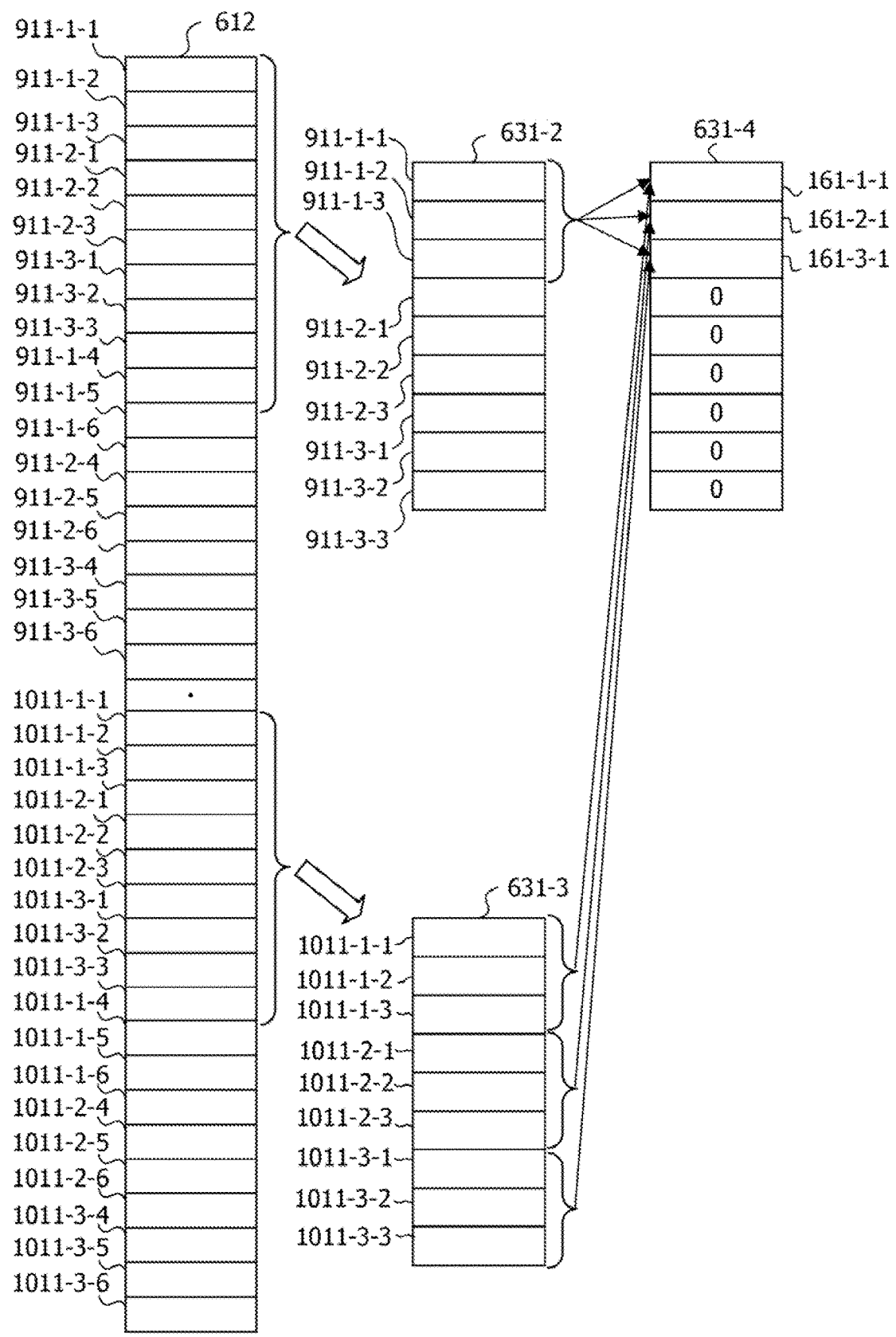
FIG. 11A illustrates an example (part 1) of operational processing using data in groups P1 and Q1.

FIG. 11A illustrates an example of intermediate results of the calculation of the data 161-1-1, the data 161-2-1, and the data 161-3-1. The cache memory 622 loads, from the main memory 612, nine pieces of data 911-*j*-*m* (j=1 to 3, m=1 to 3) into the sector 631-2 and nine pieces of data 1011-*i*-*m* (i=1 to 3, m=1 to 3) into the sector 631-3.

Using three pieces of data 911-1-*m* (m=1 to 3) in the sector 631-2 and three pieces of data 1011-1-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-1-1.

Using three pieces of data 911-1-*m* (m=1 to 3) in the sector 631-2 and three pieces of data 1011-2-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-2-1.

Using three pieces of data 911-1-*m* (m=1 to 3) in the sector 631-2 and three pieces of data 1011-3-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-3-1.

Figure 11B:
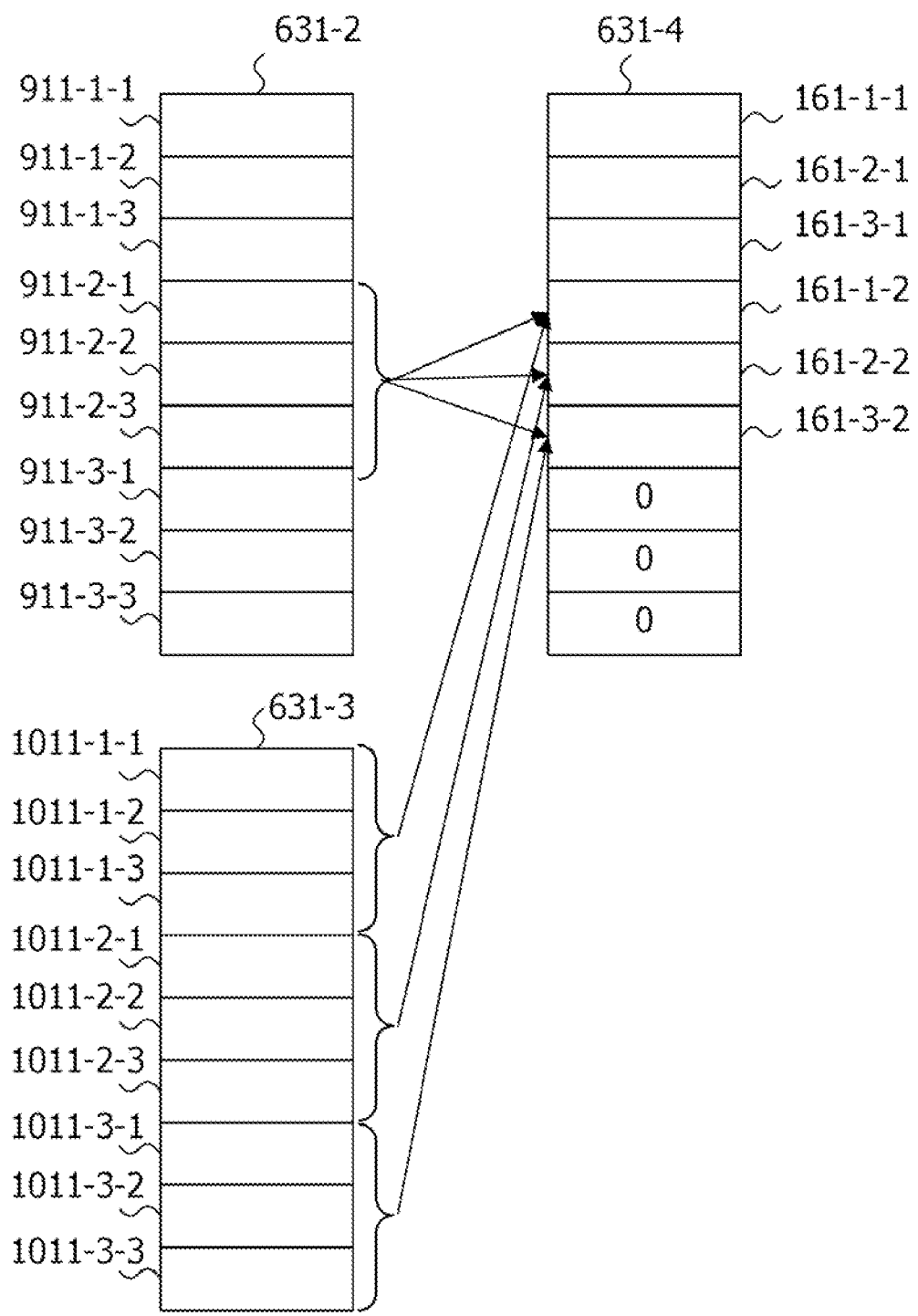
FIG. 11B illustrates an example (part 2) of operational processing using data in groups P1 and Q1.

FIG. 11B illustrates an example of intermediate results of the calculation of the data 161-1-2, the data 161-2-2, and the data 161-3-2. Using three pieces of data 911-2-*m* (m=1 to 3) in the sector 631-2 and three pieces of data 1011-1-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-1-2.

Using three pieces of data 911-2-*m* (m=1 to 3) in the sector 631-2 and three pieces of data 1011-2-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-2-2.

Using three pieces of data 911-2-*m* (m=1 to 3) in the sector 631-2 and three pieces of data 1011-3-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-3-2.

Figure 11C:
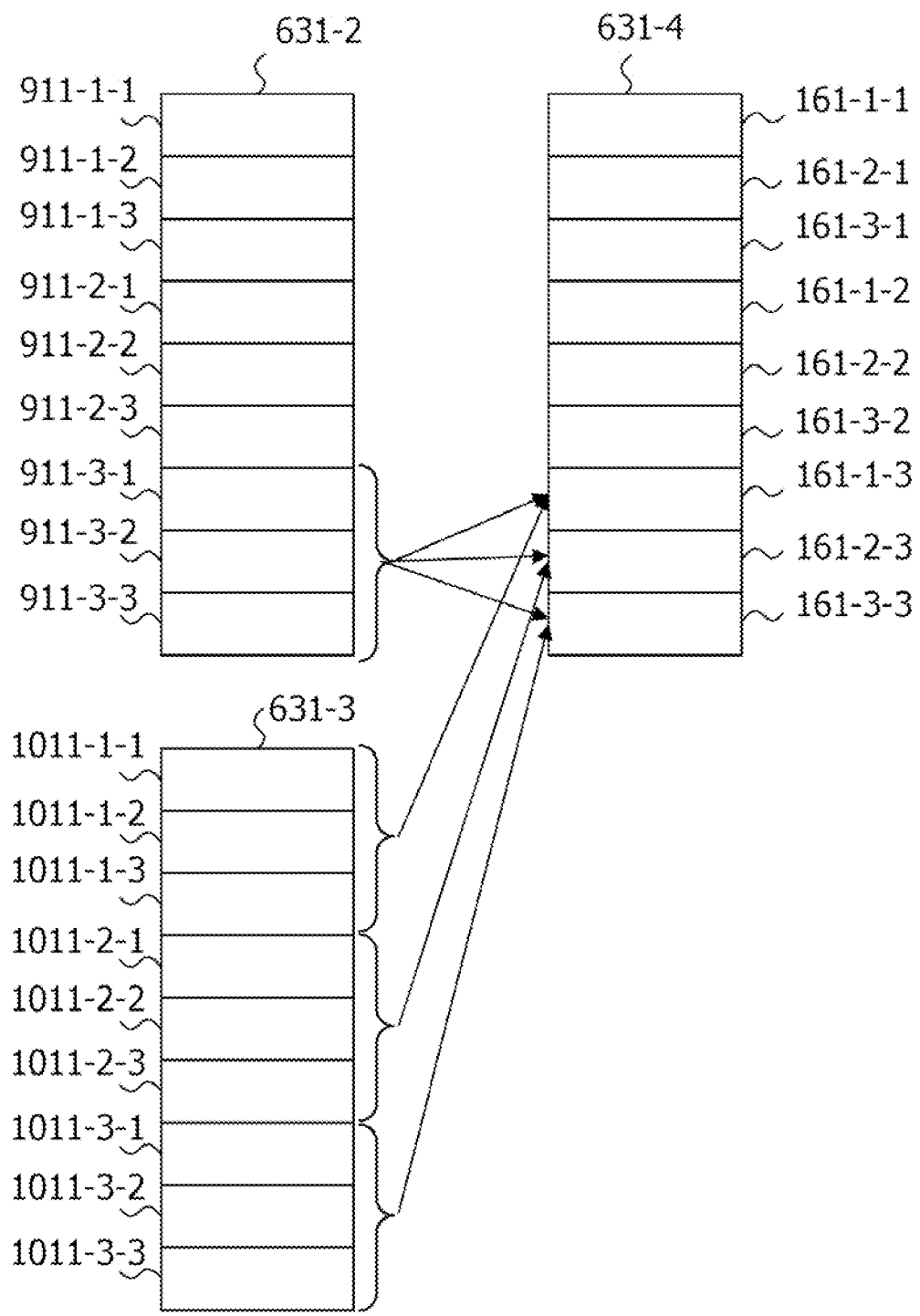
FIG. 11C illustrates an example (part 3) of operational processing using data in groups P1 and Q1.

FIG. 11C illustrates an example of intermediate results of the calculation of the data 161-1-3, the data 161-2-3, and the data 161-3-3. Using three pieces of data 911-3-*m* (m=1 to 3) in the sector 631-2 and three pieces of data 1011-1-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-1-3.

Using three pieces of data 911-3-*m* (m=1 to 3) in the sector 631-2 and three pieces of data 1011-2-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-2-3.

Using three pieces of data 911-3-*m* (m=1 to 3) in the sector 631-2 and three pieces of data 1011-3-*m* (m=1 to 3) in the sector 631-3, the operation unit 621 calculates a total sum for m=1 to 3 in the right side of the expression (3). The operation unit 621 stores the calculated total sum in the sector 631-4 as intermediate result of the data 161-3-3.

During the calculation illustrated in FIGS. 11A to 11C, data 911-*j-m* (j=1 to 3, m=1 to 3) is stored in the sector 631-2, and data 1011-*i-m* (i=1 to 3, m=1 to 3) is stored in the sector 631-3. Accordingly, these pieces of data are reused without being evicted from the cache memory 622, and the cache memory 622 may not reload these pieces of data from the main memory 612.

Figure 11D:
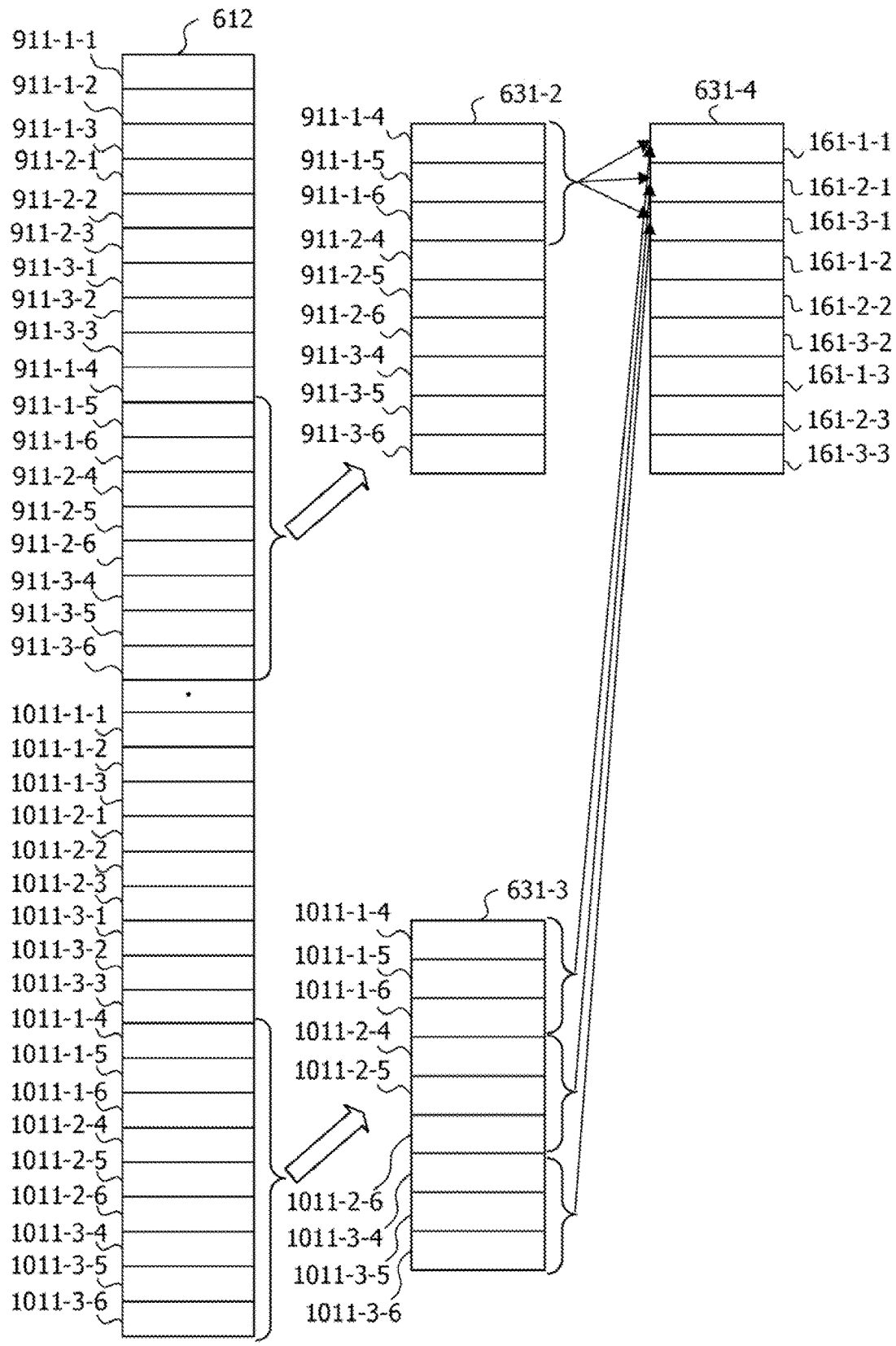
FIG. 11D illustrates an example (part 4) of operational processing using data in groups P1 and Q1.

FIG. 11D illustrates an example of final results of the calculation of the data 161-1-1, the data 161-2-1, and the data 161-3-1. The cache memory 622 loads, from the main memory 612, nine pieces of data 911-*j-m* (j=1 to 3, m=4 to 6) into the sector 631-2 and nine pieces of data 1011-*i-m* (i=1 to 3, m=4 to 6) into the sector 631-3.

Using three pieces of data 911-1-*m* (m=4 to 6) in the sector 631-2 and three pieces of data 1011-1-*m* (m=4 to 6) in the sector 631-3, the operation unit 621 calculates a total sum for m=4 to 6 in the right side of the expression (3). The operation unit 621 finds final results of the data 161-1-1 by adding the calculated total sum to the data 161-1-1 in the sector 631-4.

Using three pieces of data 911-1-*m* (m=4 to 6) in the sector 631-2 and three pieces of data 1011-2-*m* (m=4 to 6) in the sector 631-3, the operation unit 621 calculates a total sum for m=4 to 6 in the right side of the expression (3). The operation unit 621 finds final results of the data 161-2-1 by adding the calculated total sum to the data 161-2-1 in the sector 631-4.

Using three pieces of data 911-1-*m* (m=4 to 6) in the sector 631-2 and three pieces of data 1011-3-*m* (m=4 to 6) in the sector 631-3, the operation unit 621 calculates a total sum for m=4 to 6 in the right side of the expression (3). The operation unit 621 finds final results of the data 161-3-1 by adding the calculated total sum to the data 161-3-1 in the sector 631-4.

Figure 11E:
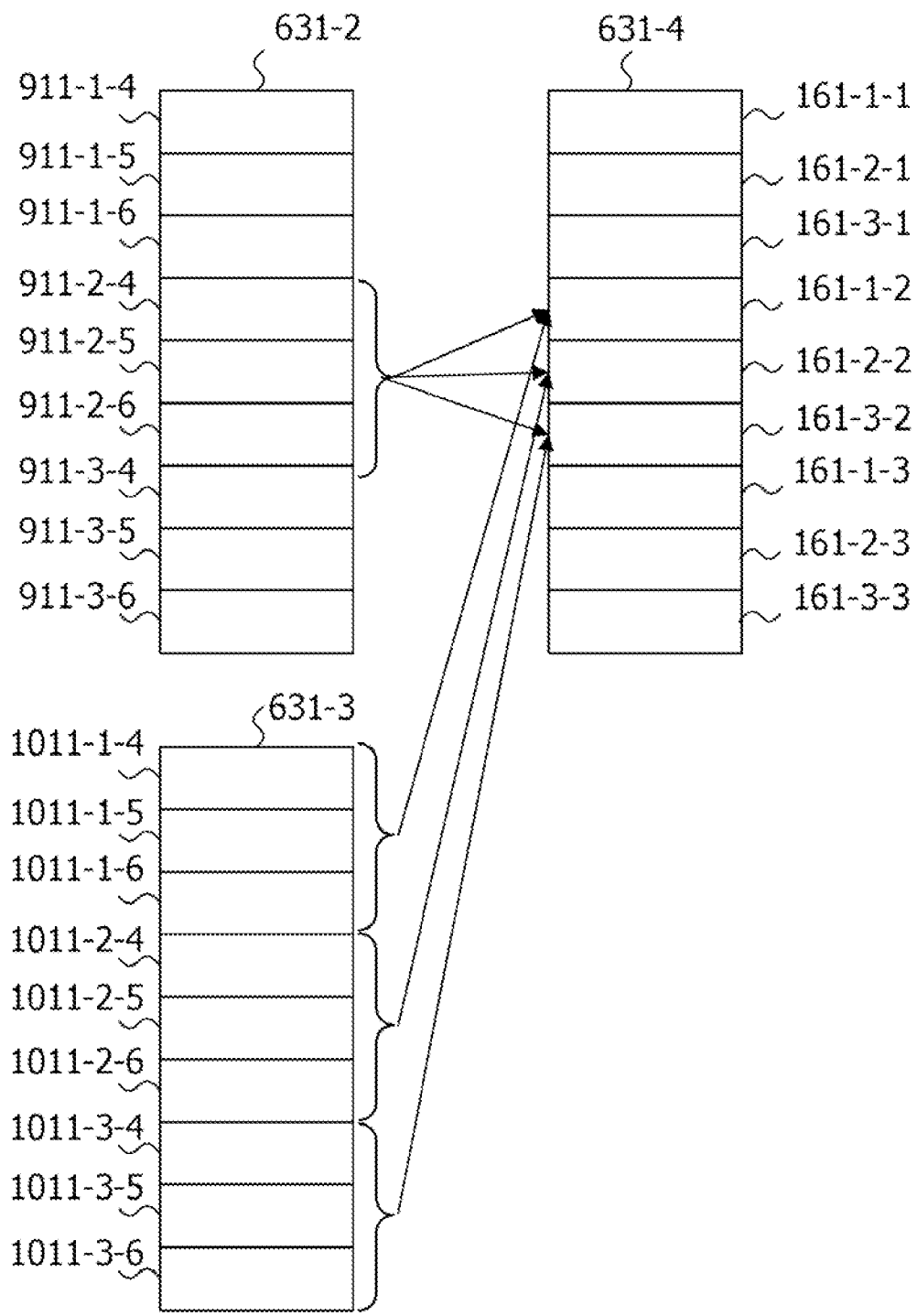
FIG. 11E illustrates an example (part 5) of operational processing using data in groups P1 and Q1.

FIG. 11E illustrates an example of final results of the calculation of the data 161-1-2, the data 161-2-2, and the data 161-3-2. Using three pieces of data 911-2-*m* (m=4 to 6) in the sector 631-2 and three pieces of data 1011-1-*m* (m=4 to 6) in the sector 631-3, the operation unit 621 calculates a total sum for m=4 to 6 in the right side of the expression (3). The operation unit 621 finds final results of the data 161-1-2 by adding the calculated total sum to the data 161-1-2 in the sector 631-4.

Using three pieces of data 911-2-*m* (m=4 to 6) in the sector 631-2 and three pieces of data 1011-2-*m* (m=4 to 6) in the sector 631-3, the operation unit 621 calculates a total sum for m=4 to 6 in the right side of the expression (3). The operation unit 621 finds final results of the data 161-2-2 by adding the calculated total sum to the data 161-2-2 in the sector 631-4.

Using three pieces of data 911-2-*m* (m=4 to 6) in the sector 631-2 and three pieces of data 1011-3-*m* (m=4 to 6) in the sector 631-3, the operation unit 621 calculates a total sum for m=4 to 6 in the right side of the expression (3). The operation unit 621 finds final results of the data 161-3-2 by adding the calculated total sum to the data 161-3-2 in the sector 631-4.

Figure 11F:
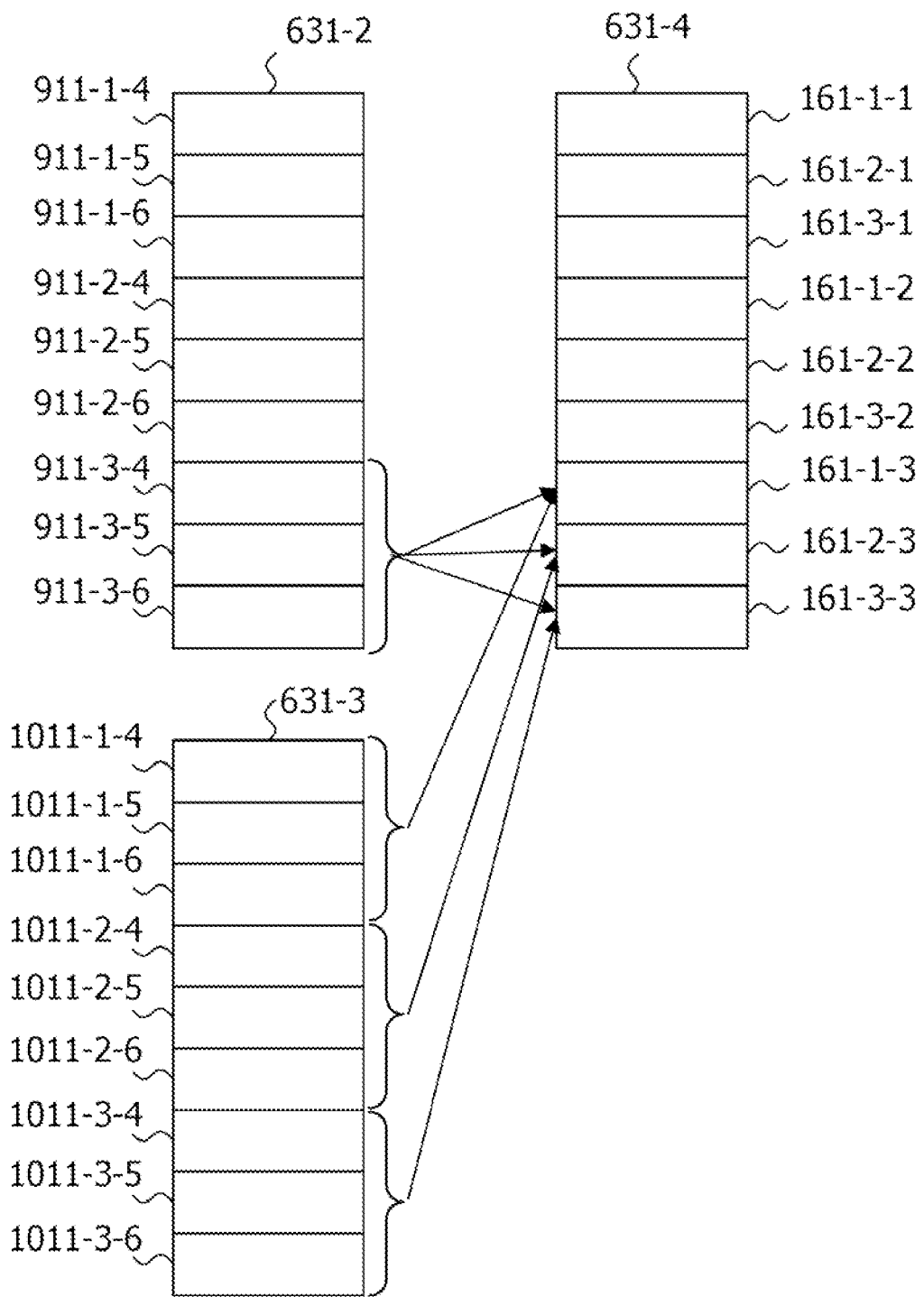
FIG. 11F illustrates an example (part 6) of operational processing using data in groups P1 and Q1.

FIG. 11F illustrates an example of final results of the calculation of the data 161-1-3, the data 161-2-3, and the data 161-3-3. Using three pieces of data 911-3-*m* (m=4 to 6) in the sector 631-2 and three pieces of data 1011-1-*m* (m=4 to 6) in the sector 631-3, the operation unit 621 calculates a total sum for m=4 to 6 in the right side of the expression (3). The operation unit 621 finds final results of the data 161-1-3 by adding the calculated total sum to the data 161-1-3 in the sector 631-4.

Using three pieces of data 911-3-*m* (m=4 to 6) in the sector 631-2 and three pieces of data 1011-2-*m* (m=4 to 6) in the sector 631-3, the operation unit 621 calculates a total sum for m=4 to 6 in the right side of the expression (3). The operation unit 621 finds final results of the data 161-2-3 by adding the calculated total sum to the data 161-2-3 in the sector 631-4.

Using three pieces of data 911-3-*m* (m=4 to 6) in the sector 631-2 and three pieces of data 1011-3-*m* (m=4 to 6) in the sector 631-3, the operation unit 621 calculates a total sum for m=4 to 6 in the right side of the expression (3). The operation unit 621 finds final results of the data 161-3-3 by adding the calculated total sum to the data 161-3-3 in the sector 631-4.

During the calculation illustrated in FIGS. 11D to 11F, data 911-*j-m* (j=1 to 3, m=4 to 6) is stored in the sector 631-2, and data 1011-*i-m* (i=1 to 3, m=4 to 6) is stored in the sector 631-3. Accordingly, these pieces of data are reused without being evicted from the cache memory 622, and the cache memory 622 may not reload these pieces of data from the main memory 612.

During the calculation as illustrated in FIGS. 11D to 11F, intermediate results of data 161-*i-j* (i=1 to 3, j=1 to 3) are stored in the sector 631-4. Thus, these intermediate results are reused without being evicted from the cache memory 622.

Figure 12:
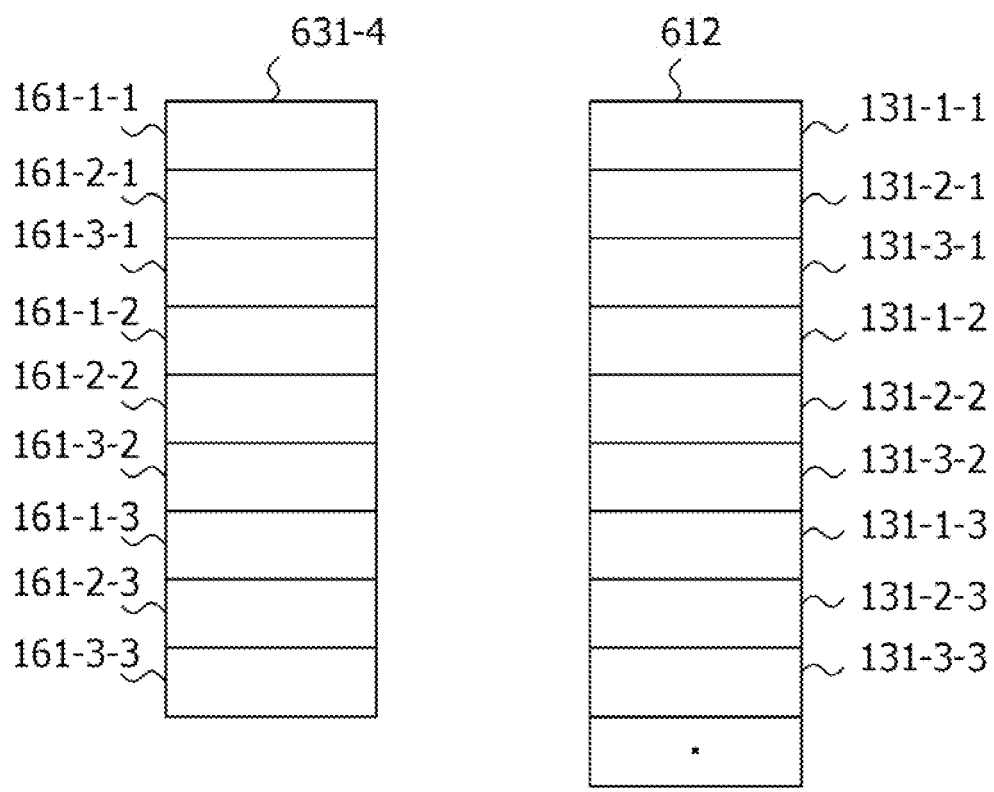
FIG. 12 is a flow chart illustrating transformation processing.

FIG. 12 illustrates an example of transformation processing of transforming calculated data 161-*i-j*. The operation unit 621 transforms data 161-*i-j* (i=1 to 3, j=1 to 3) in the sector 631-4 into data 131-*i-j* by the expression (4). The data 131-*i-j* correspond to a matrix O(i,j) representing a part of an output image. The cache memory 622 outputs the data 131-*i-j* to the main memory 612.

Figure 13:
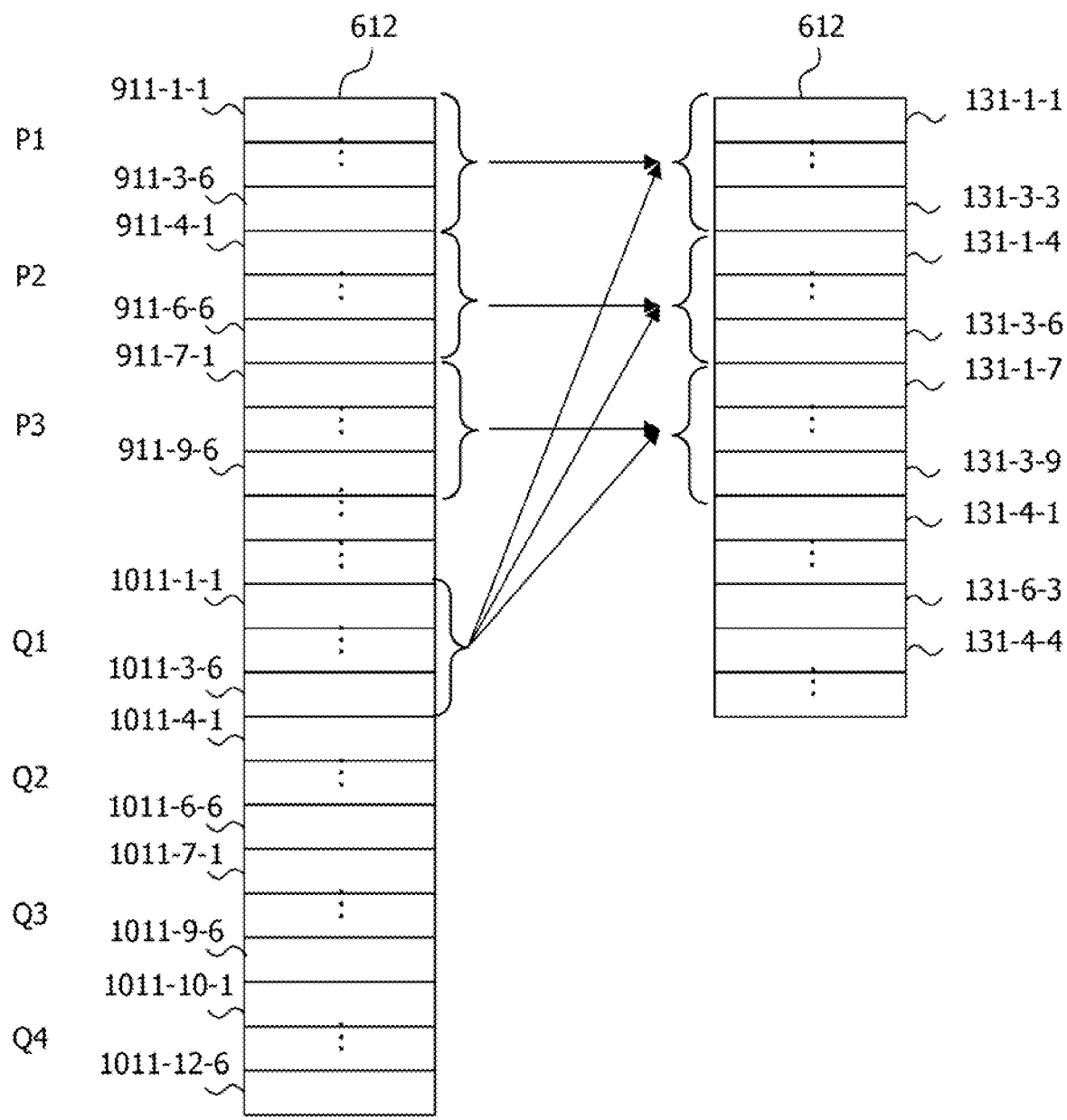
FIG. 13 is a view illustrating operational processing using data in groups P1 to P3 and groups Q1 to Q4.

FIG. 13 illustrates an example of operational processing using data 911-*j-m* in the groups P1 to P3 and data 1011-*i-m* in the groups Q1 to Q4 that are placed in the main memory 612.

Using 18 pieces of data 911-*j-m* in the group P1 and 18 pieces of data 1011-*i-m* in the group Q1, the operation unit 621 calculates data 161-*i-j* (i=1 to 3, j=1 to 3) by the operational processing illustrated in FIGS. 11A to 11F. The operation unit 621 transforms data 161-*i-j* into data 131-*i-j* by the transformation processing illustrated in FIG. 12 and stores the transformed data in the main memory 612.

Using 18 pieces of data 911-*j-m* in the group P2 and 18 pieces of data 1011-*i-m* in the group Q1, the operation unit 621 calculates data 161-*i-j* (i=1 to 3, j=4 to 6) by same as operational processing illustrated in FIGS. 11A to 11F. The operation unit 621 transforms data 161-*i-j* into data 131-*i-j* by same as the transformation processing illustrated in FIG. 12 and stores the transformed data in the main memory 612.

Using 18 pieces of data 911-*j-m* in the group P3 and 18 pieces of data 1011-*i-m* in the group Q1, the operation unit 621 calculates data 161-*i-j* (i=1 to 3, j=7 to 9) by the same as operational processing illustrated in FIGS. 11A to 11F. The operation unit 621 transforms data 161-*i-j* into data 131-*i-j* by same as the transformation processing illustrated in FIG. 12 and stores the transformed data in the main memory 612.

The operation unit 621 changes the groups Q1 to Q2 and repeats similar operational processing to calculate data 161-

$i$-$j$ ($i$=4 to 6, $j$=1 to 9), transforms the data 161-$i$-$j$ into data 131-$i$-$j$, and stores the transformed data in the main memory 612.

The operation unit 621 changes the groups Q2 to Q3 and repeats similar operational processing to calculate data 161-$i$-$j$ ($i$=7 to 9, $j$=1 to 9), transforms the data 161-$i$-$j$ into data 131-$i$-$j$, and stores the transformed data in the main memory 612.

The operation unit 621 changes the groups Q3 to Q4 and repeats similar operational processing to calculate data 161-$i$-$j$ ($i$=10 to 12, $j$=1 to 9), transforms the data 161-$i$-$j$ into data 131-$i$-$j$, and stores the transformed data in the main memory 612.

In consideration of the storage capacity of the sector 631-4 in the cache memory 622, the information processor 601 in FIG. 6 determines the number NO' of pieces of data 161-$i$-$j$ calculated at one time. The number NI' of the data groups 141-$i$ and the number Nf' of the data groups 151-$j$ are determined based on NO', and using NI' and Nf', the data 911-$j$-$m$ and the data 1011-$i$-$m$ are placed in the main memory 612.

This enables reuse of various data stored in the sectors 631-2 to sector 631-4, reducing memory accesses and shortening operating time. As an example, operating time of the convolution in the CNN in image recognition is reduced to about $\frac{1}{10}$ to $\frac{1}{100}$.

The placement method illustrated in FIGS. 9 and 10 and the operational processing illustrated in FIGS. 11A to 11F are not limited to convolution using Winograd algorithm, and may be applied to various operations of generating a plurality of third matrixes using a plurality of first matrixes and a plurality of second matrixes.

Figure 14:
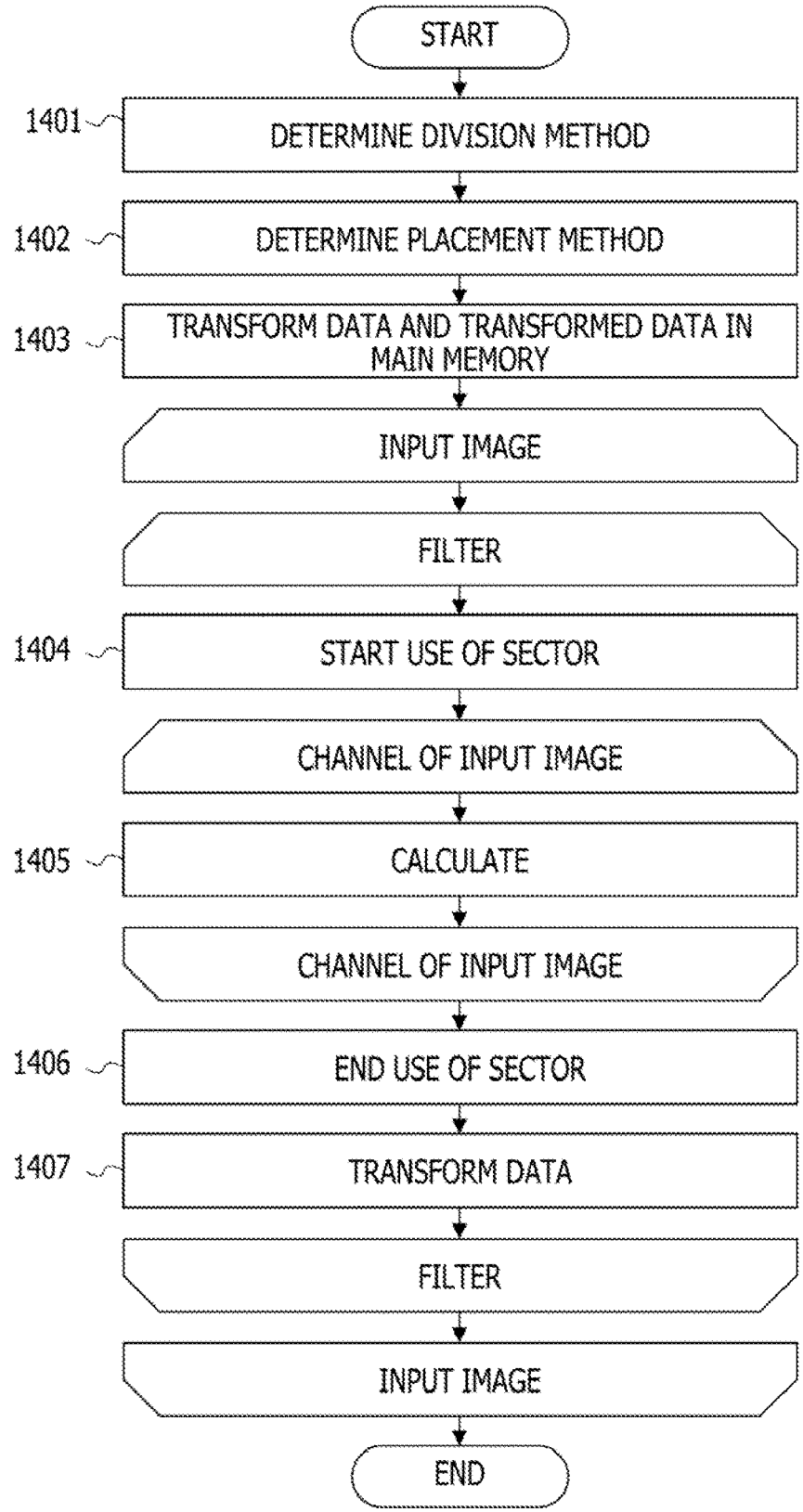
FIG. 14 is a flow chart illustrating convolution processing.

FIG. 14 is a flow chart illustrating an example of convolution processing executed by the information processor 601 in FIG. 6. The operation unit 621 of the CPU 611 uses the main memory 612 to perform a program of the convolution processing, thereby executing the convolution processing in FIG. 14. The steps in trapezoidal boxes indicate starts and ends of looped operations to be repeated.

The operation unit 621 determines a division method of K×N pieces of data 161-$i$-$j$ by the expressions (11) and (12) (step 1401). Using NI' and Nf' in the expression (12), the operation unit 621 determines a placement method of placing K data groups 141-$i$ and N data groups 151-$j$ in the main memory 612 (step 1402).

The operation unit 621 transforms a part of an input image of each channel included in each of the data groups 111-$i$ into data 1011-$i$-$m$ by the expression (1), and transforms a filter of each channel included in each of the data groups 121-$j$ into data 911-$j$-$m$ by the expression (2). The operation unit 621 places the data 911-$j$-$m$ ($j$=1 to N, $m$=1 to M) and the data 1011-$i$-$m$ ($i$=1 to K, $m$=1 to M) in the main memory 612 according to the determined placement method (step 1403).

The operation unit 621 selects data 1011-$i$-$m$ ($i$=1 to NI') and selects data 911-$j$-$m$ a=1 to Nf').

The operation unit 621 starts the use of the sector 631-2, the sector 631-3, and the sector 631-4 in the cache memory 622 according to a sector use start declaration described in the program (step 1404). At this time, the operation unit 621 assigns the sector 631-2 to the data 911-$j$-$m$ ($j$=1 to Nf'), and assigns the sector 631-3 to the data 1011-$i$-$m$ ($i$=1 to NI'). The operation unit 621 assigns the sector 631-4 to the data 161-$i$-$j$ ($i$=1 to NI', $j$=1 to Nf').

For example, a following pragma may be used as the sector use start declaration.

pragma statement scache_isolate_assign f',I',O'

The reuse of data is facilitated by designating data to be stored in each sector 631-$k$ ($k$=2 to 4) using the pragma.

The operation unit 621 selects data 911-$j$-$m$ ($j$=1 to Nf', $m$=1 to Nf') in the first channel group and selects data 1011-$i$-$m$ ($i$=1 to NI', $m$=1 to NI') in the first channel group.

The cache memory 622 loads the selected data 911-$j$-$m$ into the sector 631-2 and the selected data 1011-$i$-$m$ into the sector 631-3. The operation unit 621 calculates intermediate results of data 161-$i$-$j$ ($i$=1 to NI', $j$=1 to Nf') by the expression (3) and stores the calculated intermediate results in the sector 631-4 (step 1405).

The operation unit 621 selects data 911-$j$-$m$ ($j$=1 to Nf', $m$=Nf'+1 to 2Nf') in a next channel group, and selects data 1011-$i$-$m$ ($i$=1 to NI', $m$=NI'+1 to 2NI') in a next channel group. The operation unit 621 repeats the processing in step 1405 to update intermediate results of data 161-$i$-$j$ ($i$=1 to NI', $j$=1 to Nf').

The operation unit 621 repeats the processing in step 1405 while further changing the selection of the channel groups of the data 911-$j$-$m$ and the data 1011-$i$-$m$ to further update intermediate results of the data 161-$i$-$j$ ($i$=1 to NI', $j$=1 to Nf').

When the last channel groups of the data 911-$j$-$m$ and the data 1011-$i$-$m$ are selected, in step 1405, the operation unit 621 calculates final results of data 161-$i$-$j$ ($i$=1 to NI', $j$=1 to Nf') and stores the final results in the sector 631-4. Thus, the processing in step 1405 is repeated M/Nf'(=M/NI') times.

The operation unit 621 terminates the use of the sector 631-2, the sector 631-3, and the sector 631-4 in the cache memory 622 according to a sector use end declaration described in the program (step 1406). At this time, the operation unit 621 cancels the assignment of the sector 631-2, the sector 631-3, and the sector 631-4.

For example, a following pragma may be used as the sector use end declaration.

pragma statement end_scache_isolate_assign

The operation unit 621 transforms data 161-$i$-$j$ ($i$=1 to NI', $j$=1 to Nf') in the sector 631-4 into data 131-$i$-$j$ by the expression (4) (step 1407). The cache memory 622 outputs the data 131-$i$-$j$ to the main memory 612. The processing in step 1404 to step 1407 is referred to as processing X. The processing X includes repeating the processing in step 1405 M/Nf' times.

The operation unit 621 selects data 911-$j$-$m$ ($j$=Nf'+1 to 2Nf') in a next group and repeats the processing X, generating data 131-$i$-$j$ ($i$=1 to NI', $j$=Nf'+1 to 2Nf').

The operation unit 621 repeats the processing X while further changing the selection of the group of the data 911-$j$-$m$, thereby generating the data 131-$i$-$j$ ($i$=1 to NI', $j$=1 to N). Accordingly, the processing X is repeated N/Nf' times. The processing of repeating the processing X N/Nf' times is referred to as processing Y.

The operation unit 621 selects data 1011-$i$-$m$ ($i$=NI'+1 to 2NI') in a next group and repeats the processing Y, generating data 131-$i$-$j$ ($i$=NI'+1 to 2NI', $j$=1 to N).

The operation unit 621 repeats the processing Y while further changing the selection of the group of the data 1011-$i$-$m$, thereby generating the data 131-$i$-$j$ ($i$=1 to K, $j$=1 to N). Accordingly, the processing Y is repeated K/NI' times.

Figure 15:
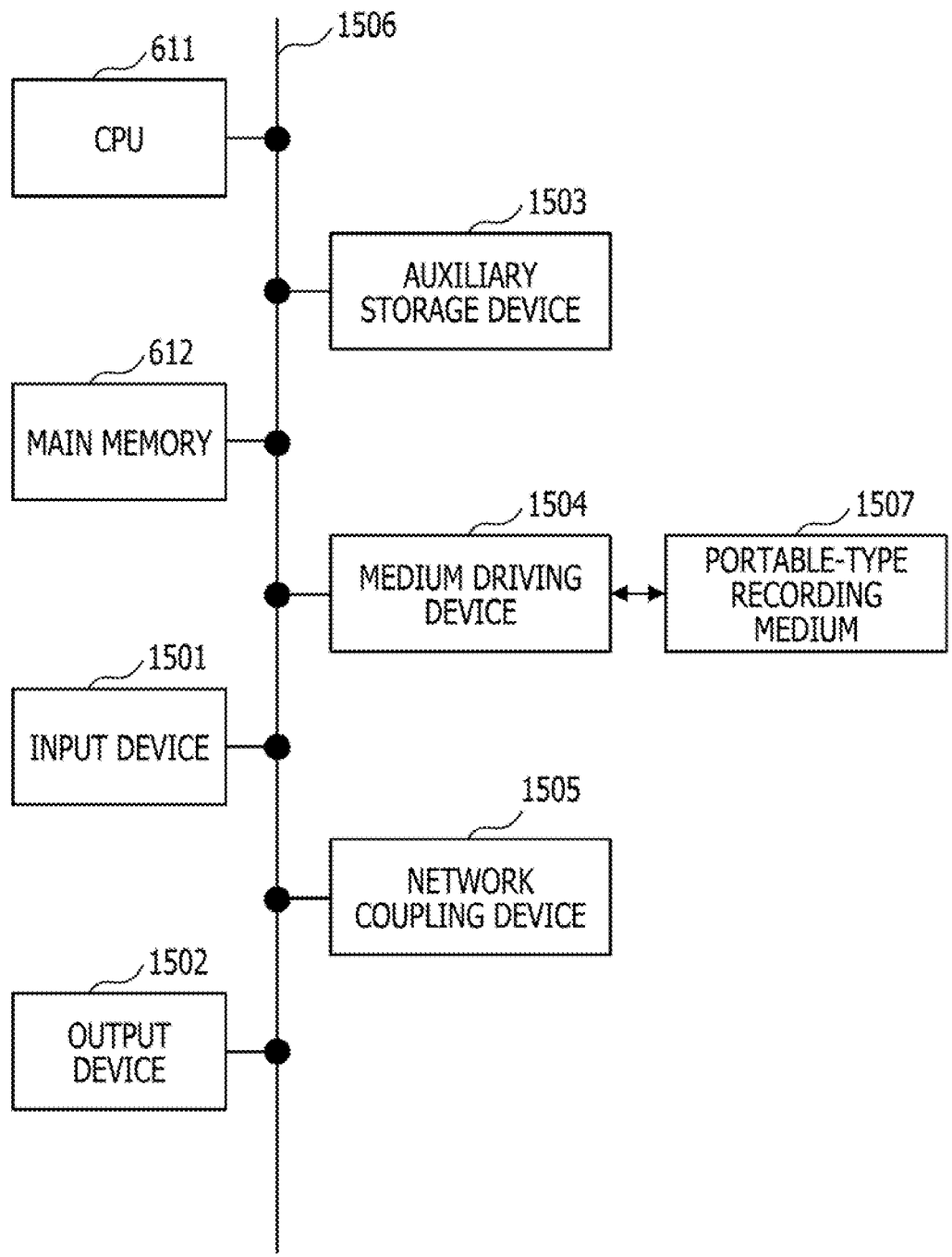
FIG. 15 is a view illustrating a second example of the hardware configuration of the information processor.

FIG. 15 illustrates a second example of the hardware configuration of an information processor including the processor 401 in FIG. 4. The information processor in FIG. 15 includes the CPU 611, the main memory 612, an input device 1501, an output device 1502, an auxiliary storage device 1503, a medium driving device 1504, and a network coupling device 1505. These components are hardware, and are coupled each other via a bus 1506. The configuration of the CPU 611 is the same as that in FIG. 6.

The input device 1501 is, for example, a keyboard, a pointing device, or the like, and is used to input an instruction or information from the user or operator. The output device 1502 is, for example, a display device, a printer or the like, and is used to output an inquiry or instruction to the user or operator, and processing results. The processing results may be estimation results output from the CNN.

Examples of the auxiliary storage device 1503 includes a magnetic disc device, an optical disc device, a magneto-optical disc device, and a tape device, or the like. The auxiliary storage device 1503 may be a hard disc drive. The information processor may store a program and data in the auxiliary storage device 1503, and load them into the main memory 612 for use.

The medium driving device 1504 drives a portable-type recording medium 1507 and accesses recorded contents. Examples of the portable-type recording medium 1507 includes a memory device, a flexible disc, an optical disc, and a magneto-optical disc, or the like. The portable-type recording medium 1507 may be a compact disk read-only memory (CD-ROM), a Digital Versatile Disk (DVD), a Universal Serial Bus (USB), or the like. The user or operator may store a program and data in the portable-type recording medium 1507, and load them into the main memory 612 for use.

As described above, a computer-readable recording medium that stores a program and data for processing is a physical (non-temporary) recording medium such as the main memory 612, the auxiliary storage device 1503, or the portable-type recording medium 1507.

The network coupling device 1505 is a communication interface circuit coupled to a communication network such as a local area network (LAN) or a wide area network (WAN) to perform data conversion associated with communication. The information processor receives a program and data from an external device via the network coupling device 1505, loads the program and data into the main memory 612, and uses them.

The configuration of the processor 401 in FIG. 4 is only an example, and some components may be omitted or changed depending on the application or conditions of the processor 401. The configuration of the information processor 601 in FIG. 6 and the information processor in FIG. 15 is only an example, and some components may be omitted or changed depending on the application or conditions of the information processor.

For example, the cache memory 622 in FIG. 6 may include five or more sectors. When an interface with the user or operator in the information processor illustrated in FIG. 15 is not requested, the input device 1501 and the output device 1502 may be omitted. When the portable-type recording medium 1507 or the communication network is not used, the medium driving device 1504 or the network coupling device 1505 may be omitted.

The flow charts in FIGS. 5 and 14 are only examples, and some processing may be omitted or changed depending on the configuration or conditions of the processor 401 or the information processor 601. For example, in the convolution processing in FIG. 14, even if loop processing for the data 1011-$i$-$m$ ($i$=1 to NI') is exchanged with loop processing for the data 911-$j$-$m$ ($j$=1 to Nf'), the same operation results may be acquired.

The convolution illustrated in FIG. 1 is only an example, and convolution varies depending on information processing to which the CNN is applied. The information processing to which the CNN is applied may be information processing other than image recognition.

The configurations of the CPU illustrated in FIGS. 2 and 3 are only examples, and some components may be omitted or changed depending on the application or conditions of the CPU. The input image and data groups of the filter in FIG. 7 are only examples, and the input image and data groups of the filter vary depending on information processing to which the CNN is applied.

The method of determining NI' and Nf' in FIG. 8 is only an example, and NI' and Nf' may be determined by any other determination method. NI' and Nf' are different values. The data placement methods illustrated in FIGS. 9 and 10 are only examples, and the data placement method varies depending on information processing to which the CNN is applied. The operational processing illustrated in FIGS. 11A to 11F and FIG. 13 is only an example, and the operational processing varies depending on the data placement method. The transformation processing illustrated in FIG. 12 is only an example, and the transformation processing varies depending on the operational processing.

The expressions (1) to (12) are merely example, and the information processor 601 may execute convolution processing using other expressions.

Although the disclosed embodiment and its advantages have been described in detail, those skilled in the art could make various modifications, additions, and omissions without deviating from the scope of the embodiment clearly recited in claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data placement method performed by a computer, the method comprising:

when performing an operation using a plurality of first data groups and a plurality of second data groups to generate a plurality of pieces of operation result data representing operation results of the operation, based on a size of one piece of the operation result data among the plurality of pieces of operation result data and a size of an operation result area storing one or more of the plurality of pieces of operation result data in a cache memory, determining a number of the first data groups corresponding to the one or more pieces of operation result data in the plurality of first data groups and a number of the second data groups corresponding to the one or more pieces of operation result data in the plurality of second data groups; and placing the plurality of first data groups and the plurality of second data groups in a main memory based on the number of the first data groups and the number of the second data groups, the plurality of first data groups each includes a plurality of pieces of first data, the plurality of second data groups each includes a plurality of pieces of second data, the placing includes:

dividing the plurality of first data groups into a plurality of first groups each including the determined number of the first data groups;
dividing the plurality of pieces of the first data included in each of the plurality of first groups into a plurality of first partial data groups;
selecting any first group from the plurality of first groups;
selecting any first partial data group from each of the plurality of first partial data groups included in the selected first group;
continuously placing the first partial data group selected from each of the determined number of first data groups in the selected first group in the main memory;
dividing the plurality of second data groups into a plurality of second groups each including the determined number of the second data groups;
dividing the plurality of pieces of the second data included in each of the plurality of second groups into a plurality of second partial data groups;
selecting any second group from the plurality of second groups;
selecting any second partial data group from each of the plurality of second partial data groups included in the selected second group; and
continuously placing the second partial data group selected from each of the determined number of second data groups in the selected second group in the main memory.

2. The data placement method according to claim 1, wherein the determining includes:
finding a number of pieces of operation result data included in the one or more pieces of operation result data based on the size of the one piece of the operation result data and the size of the operation result area; and
determining the number of the first data groups and the number of the second data groups based on the number of the pieces of operation result data.

3. The data placement method according to claim 1, wherein
the cache memory includes the operation result area, a first storage area, and a second storage area, and
the method further comprising:
loading the first partial data groups, selected from each of the determined number of the first data groups continuously placed in the main memory, into the first storage area;
loading the second partial data groups, selected from each of the determined number of the second data groups continuously placed in the main memory, into the second storage area;
generating the one or more pieces of operation result data by using the first partial data groups loaded into the first storage area and the second partial data groups loaded into the second storage area; and
storing the generated one or more pieces of operation result data in the operation result area.

4. A processing apparatus comprising:
a main memory,
a cache memory, and
a processor, coupled to the main memory and the cache memory, and configured to:
when performing an operation using a plurality of first data groups and a plurality of second data groups to generate a plurality of pieces of operation result data representing operation results of the operation, based on a size of one piece of the operation result data among the plurality of pieces of operation result data and a size of an operation result area storing one or more pieces of the plurality of pieces of operation result data in a cache memory, determine a number of the first data groups corresponding to the one or more pieces of operation result data in the plurality of first data groups and a number of the second data groups corresponding to the one or more pieces of operation result data in the plurality of second data groups; and
place the plurality of first data groups and the plurality of second data groups in a main memory based on the number of the first data groups and the number of the second data groups,
the plurality of first data groups each includes a plurality of pieces of first data, and
the plurality of second data groups each includes a plurality of pieces of second data,
the processor is further configured to:
divide the plurality of first data groups into a plurality of first groups each including the determined number of the first data groups;
divide the plurality of pieces of the first data included in each of the plurality of first groups into a plurality of first partial data groups;
select any first group from the plurality of first groups;
select any first partial data group from each of the plurality of first partial data groups included in the selected first group;
continuously place the first partial data group selected from each of the determined number of first data groups in the selected first group in the main memory;
divide the plurality of second data groups into a plurality of second groups each including the determined number of the second data groups;
divide the plurality of pieces of the second data included in each of the plurality of second groups into a plurality of second partial data groups;
select any second group from the plurality of second groups;
select any second partial data group from each of the plurality of second partial data groups included in the selected second group; and
continuously place the second partial data group selected from each of the determined number of second data groups in the selected second group in the main memory.

5. The processing apparatus according to claim 4, wherein the processor is further configured to:
find a number of pieces of operation result data included in the one or more pieces of operation result data based on the size of the one piece of the operation result data and the size of the operation result area; and
determine the number of the first data groups and the number of the second data groups based on the number of the pieces of operation result data.

6. The processing apparatus according to claim 4, wherein
the cache memory includes the operation result area, a first storage area, and a second storage area, and
the processor is further configured to:
load the first partial data groups, selected from each of the determined number of the first data groups continuously placed in the main memory, into the first storage area;
load the second partial data groups, selected from each of the determined number of the second data groups continuously placed in the main memory, into the second storage area;

generate the one or more pieces of operation result data by using the first partial data groups loaded into the first storage area and the second partial data groups loaded into the second storage area; and store the generated one or more pieces of operation result data in the operation result area.

7. A non-transitory computer-readable recording medium storing a data placement program, causing a computer to execute a process comprising:

when performing an operation using a plurality of first data groups and a plurality of second data groups to generate a plurality of pieces of operation result data representing operation results of the operation, based on a size of one piece of the operation result data among the plurality of pieces of operation result data and a size of an operation result area storing one or more of the plurality of pieces of operation result data in a cache memory, determining a number of the first data groups corresponding to the one or more pieces of operation result data in the plurality of first data groups and a number of the second data groups corresponding to the one or more pieces of operation result data in the plurality of second data groups; and placing the plurality of first data groups and the plurality of second data groups in a main memory based on the number of the first data groups and the number of the second data groups, the plurality of first data groups each includes a plurality of pieces of first data, the plurality of second data groups each includes a plurality of pieces of second data, the placing includes:

dividing the plurality of first data groups into a plurality of first groups each including the determined number of the first data groups;

dividing a plurality of pieces of the first data included in each of the plurality of first groups into a plurality of first partial data groups;

selecting any first group from the plurality of first groups;

selecting any first partial data group from each of the plurality of first partial data groups included in the selected first group;

continuously placing the first partial data group selected from each of the determined number of first data groups in the selected first group in the main memory;

dividing the plurality of second data croups into a plurality of second groups each including the determined number of the second data groups;

dividing a plurality of pieces of the second data included in each of the plurality of second groups into a plurality of second partial data groups;

selectins any second croup from the plurality of second groups;

selectins any second partial data group from each of the plurality of second partial data groups included in the selected second group; and continuously placing the second partial data group selected from each of the determined number of second data groups in the selected second group in the main memory.

8. The non-transitory computer-readable recording medium according to claim 7, wherein the determining includes:

finding a number of pieces of operation result data included in the one or more pieces of operation result data based on the size of the one piece of the operation result data and the size of the operation result area; and determining the number of the first data groups and the number of the second data groups based on the number of the pieces of operation result data.

9. The non-transitory computer-readable recording medium according to claim 7, wherein the cache memory includes the operation result area, a first storage area, and a second storage area, and the process further comprising:

loading the first partial data groups, selected from each of the determined number of the first data groups continuously placed in the main memory, into the first storage area;

loading the second partial data groups, selected from each of the determined number of the second data groups continuously placed in the main memory, into the second storage area;

generating the one or more pieces of operation result data by using the first partial data groups loaded into the first storage area and the second partial data groups loaded into the second storage area; and storing the generated one or more pieces of operation result data in the operation result area.

10. The non-transitory computer-readable recording medium according to claim 9, wherein the operation result area, the first storage area, and the second storage area are storage areas where eviction of data is suppressed.

11. The non-transitory computer-readable recording medium according to claim 7, wherein each of the plurality of pieces of first data included in each of the plurality of first data groups represents a matrix, each of the plurality of pieces of second data included in each of the plurality of second data groups represents a matrix, and each of the plurality of pieces of operation result data represents a matrix.

* * * * *